(12) United States Patent
Harif

(10) Patent No.: US 9,975,183 B2
(45) Date of Patent: May 22, 2018

(54) CUTTING ELEMENT AND A METHOD OF CUTTING USING THE SAME

(71) Applicant: GERSHON SYSTEM LTD., Holon (IL)

(72) Inventor: Gershon Harif, Ramat Gan (IL)

(73) Assignee: GERSHON SYSTEM LTD., Holon (IL)

( * ) Notice: Subject to any disclaimer, the term of this patent is extended or adjusted under 35 U.S.C. 154(b) by 270 days.

(21) Appl. No.: 14/914,140

(22) PCT Filed: Sep. 17, 2014

(86) PCT No.: PCT/IL2014/050830
§ 371 (c)(1),
(2) Date: Feb. 24, 2016

(87) PCT Pub. No.: WO2015/040615
PCT Pub. Date: Mar. 26, 2015

(65) Prior Publication Data
US 2016/0214181 A1     Jul. 28, 2016

(30) Foreign Application Priority Data
Sep. 17, 2013   (IL) .......................................... 228517

(51) Int. Cl.
*B23C 5/10*      (2006.01)
*B23B 27/14*     (2006.01)
(Continued)

(52) U.S. Cl.
CPC ............ *B23B 27/145* (2013.01); *B23B 27/04* (2013.01); *B23B 51/02* (2013.01); *B23C 5/06* (2013.01);
(Continued)

(58) Field of Classification Search
CPC .. B23C 5/06; B23C 5/10; B23C 5/165; B23C 5/207; B23C 2200/201; B23C 2200/202;
(Continued)

(56) References Cited

U.S. PATENT DOCUMENTS

| 4,474,721 A | 10/1984 | Carpenter |
| 4,681,486 A | 7/1987 | Hale |

(Continued)

FOREIGN PATENT DOCUMENTS

| EP | 313534 | 4/1989 |
| EP | 0502834 | 9/1992 |

(Continued)

OTHER PUBLICATIONS

International Search Report from International Application No. PCT/IB2008/002742.

*Primary Examiner* — Will Fridie, Jr.
(74) *Attorney, Agent, or Firm* — Dorsey & Whitney LLP

(57) ABSTRACT

A cutting member comprising a cutting edge $(S_1,S_2,S_i)$ defining a cutting envelope and configured for removing material from a workpiece leaving therein a corner of angle α. The cutting edge comprises a first cutting segment $(S_1)$ and a second cutting segment $(S_2)$ spaced from the first cutting segment $(S_2)$. Respective first and second imaginary tangents $(T_1,T_2)$ of the first and second cutting segments $(S_1,S_2)$ intersect one another at point O located outside the cutting envelope, forming an angle corresponding to angle α, thereby defining a cutting frame at least a portion of which extends beyond the cutting envelope. The cutting edge further comprises an adjoining cutting segment $(S_i)$, extending between and bridging the first cutting segment $(S_1)$ and the second cutting segment $(S_2)$, and at least partially contained within the cutting frame. The cutting member further comprises at least one auxiliary cutting element $(AT_1,AT_2)$ comprising an auxiliary cutting edge (Continued)

(CE',CE") extending generally along one of the imaginary tangents ($T_1,T_2$) and beyond the cutting envelope. The auxiliary cutting edge (CE',CE") does not intersect the other of the imaginary tangents (CE",CE') and/or a bisector (B) of the angle α.

20 Claims, 40 Drawing Sheets

(51) Int. Cl.
B23B 51/02 (2006.01)
B23C 5/06 (2006.01)
B23C 5/20 (2006.01)
B23B 27/04 (2006.01)

(52) U.S. Cl.
CPC ............... *B23C 5/10* (2013.01); *B23C 5/207* (2013.01); *B23B 2200/0471* (2013.01); *B23B 2200/201* (2013.01); *B23B 2251/14* (2013.01); *B23C 2200/0455* (2013.01); *B23C 2200/201* (2013.01); *B23C 2210/082* (2013.01)

(58) Field of Classification Search
CPC ........ B23C 2200/204; B23C 2200/208; B23C 2210/082; B23B 27/145; B23B 27/04
See application file for complete search history.

(56) References Cited

U.S. PATENT DOCUMENTS

| | | | |
|---|---|---|---|
| 4,776,733 A | 10/1988 | Pettersson | |
| 4,940,369 A | 7/1990 | Aebi et al. | |
| 4,946,318 A | 8/1990 | David et al. | |
| 5,160,232 A | 11/1992 | Maier | |
| 5,549,425 A | 8/1996 | Bernadic et al. | |
| 5,725,338 A | 3/1998 | Cabaret et al. | |
| 5,779,401 A | 7/1998 | Stallwitz et al. | |
| 5,791,832 A | 8/1998 | Yamayose | |
| 5,964,552 A | 10/1999 | Larsen | |
| 5,975,812 A | 11/1999 | Friedman | |
| 6,065,905 A | 5/2000 | Kinton | |
| 6,099,209 A | 8/2000 | Murray et al. | |
| 6,126,366 A | 10/2000 | Lundblad | |
| 6,138,540 A | 10/2000 | Niemi | |
| 6,164,878 A | 12/2000 | Satran et al. | |
| 6,238,146 B1 | 5/2001 | Satran et al. | |
| 6,666,630 B2 | 12/2003 | Zimmermann et al. | |
| 6,739,808 B1 | 5/2004 | Ghosh | |
| 6,957,933 B2 | 10/2005 | Pachao-Morbitzer et al. | |
| 7,264,425 B1 | 9/2007 | Viol | |
| 7,275,896 B2 | 10/2007 | Nudelman | |
| 7,862,263 B2 | 1/2011 | Van Iperen | |
| 7,896,586 B2 | 3/2011 | Morgulis | |
| 7,905,688 B2 | 3/2011 | Ertl et al. | |
| 8,277,151 B2 | 10/2012 | Wandeback | |
| 8,596,934 B2 * | 12/2013 | Lehto | B23C 5/1009 407/113 |
| 9,050,666 B2 * | 6/2015 | Kuroda | B23C 5/10 |
| 9,227,253 B1 * | 1/2016 | Swift | B23C 5/28 |
| 9,649,693 B2 * | 5/2017 | Friedl | B23B 27/1611 |
| 9,796,028 B2 * | 10/2017 | Fang | B23C 5/20 |
| 2002/0119016 A1 | 8/2002 | Woodward | |
| 2004/0170481 A1 | 9/2004 | Gati | |
| 2004/0265075 A1 | 12/2004 | Kolker | |
| 2005/0186037 A1 * | 8/2005 | Svensson | B23C 5/10 407/53 |
| 2006/0045633 A1 | 3/2006 | Morgulis | |
| 2008/0298909 A1 | 12/2008 | Gaudreault | |
| 2009/0220312 A1 | 9/2009 | Shamoto et al. | |
| 2009/0245946 A1 | 10/2009 | Maeda | |
| 2010/0183386 A1 | 7/2010 | Heinloth et al. | |
| 2010/0215446 A1 | 8/2010 | Wandeback | |
| 2010/0239378 A1 * | 9/2010 | Azegami | B23C 5/10 407/54 |
| 2010/0254775 A1 | 10/2010 | Hecht | |
| 2010/0316452 A1 | 12/2010 | Ishida | |
| 2011/0217132 A1 * | 9/2011 | Wells | B23C 5/10 407/54 |
| 2012/0282047 A1 | 11/2012 | Choi et al. | |
| 2016/0074947 A1 * | 3/2016 | Shpigelman | B23C 5/10 407/54 |
| 2016/0250695 A1 * | 9/2016 | Baba | B23C 5/10 409/131 |
| 2017/0232532 A1 * | 8/2017 | Wells | B23C 5/10 407/54 |
| 2017/0291230 A1 * | 10/2017 | Harpaz | B23C 5/10 |

FOREIGN PATENT DOCUMENTS

| | | |
|---|---|---|
| EP | 585800 | 3/1994 |
| EP | 1547710 | 6/2005 |
| EP | 2119521 | 11/2009 |
| EP | 2759363 | 7/2014 |
| JP | 05116018 | 5/1993 |
| JP | 200769290 | 3/2007 |
| WO | 1998/01253 | 1/1998 |
| WO | 2002/40850 | 5/2002 |
| WO | 2009/053803 | 4/2009 |
| WO | 2009/137149 | 11/2009 |
| WO | 2011/001438 | 1/2011 |
| WO | 2013/016018 | 1/2013 |
| WO | 2013/175478 | 11/2013 |

* cited by examiner

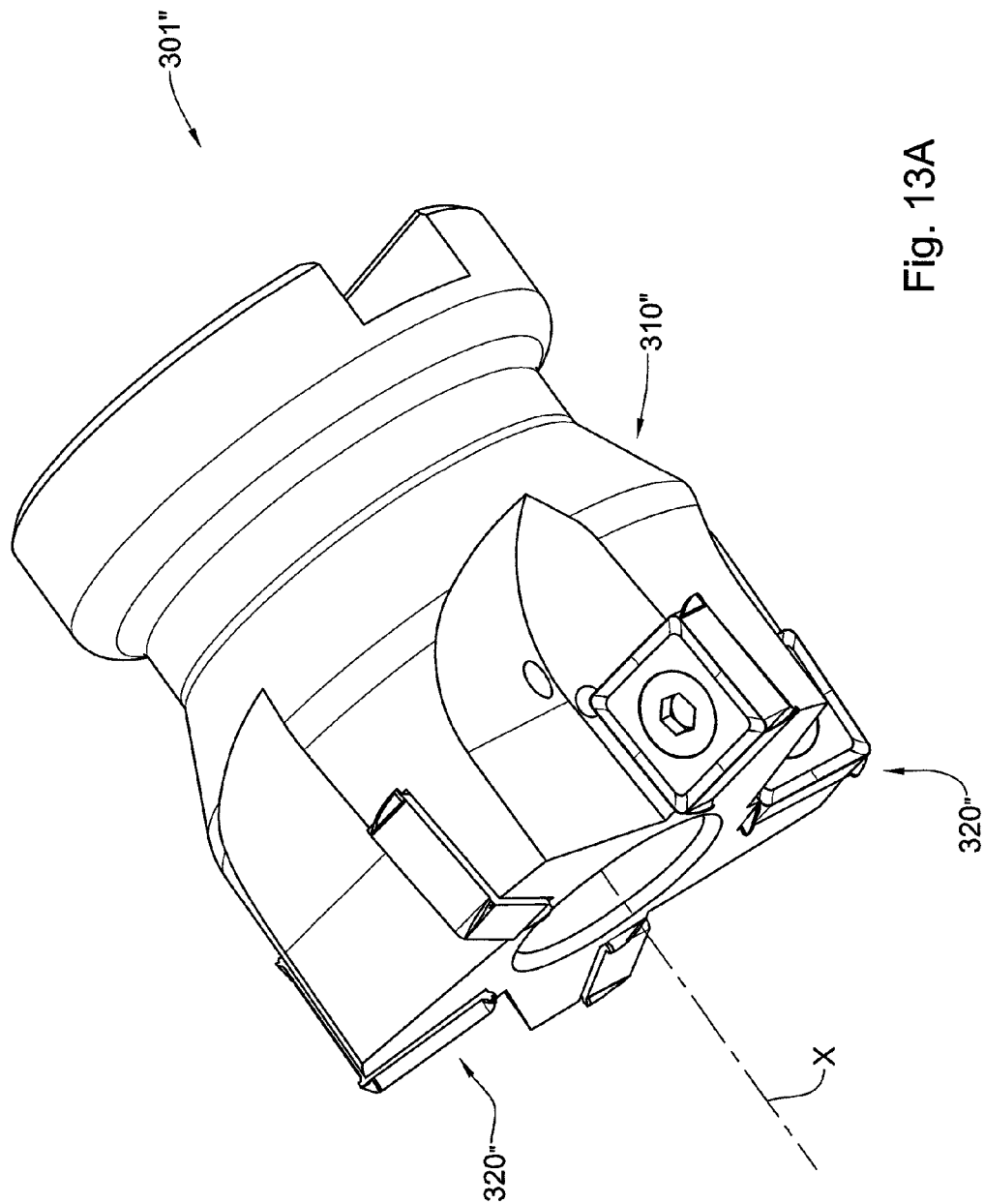

CUTTING ELEMENT AND A METHOD OF CUTTING USING THE SAME

TECHNOLOGICAL FIELD

The present invention relates to cutting elements, in particular, cutting elements used in cutting tool and configured for operating in conjunction with the cutting edge of the tool.

BACKGROUND

Cutting tools are used for removing material from a workpiece in order to manufacture therefrom a desired final element. There exists in common practice a great variety of operations for the removal of material, for each of which, a specific tool is designed. Cutting tools are usually in either the form of a single body or in the form of a tool holder with one or more replaceable cutting inserts mounted thereon. Examples of such operations are drilling, milling, turning, boring etc.

A majority of cutting tools or cutting inserts are formed with a cutting edge adapted to come in contact with the workpiece, within a cutting zone, so as to remove material therefrom during a cutting operation, the removed material being in the form of a chip.

Each cutting edge of a cutting tool or cutting insert is known to have a rake surface extending from the cutting edge in the direction away from the workpiece and a relief surface extending from the cutting edge transversely to the rake surface and generally facing in the direction of the workpiece, the cutting edge being defined at the intersection between its rake and relief surfaces.

The rake surface is adapted to come in contact with the removed chip, while the relief surface is generally designed so as not to come in contact with the workpiece during cutting operation.

It has been known to provide additional elements on the relief surface, for example, elements configured for deforming the workpiece prior to the cutting operation.

One such example is set forth by the applicant himself in WO09053803, which discloses a cutting element adapted for removing a chip from a surface of a workpiece has at least one cutting edge defined by an intersection line between a rake and a relief surface and is formed with one or more workpiece deforming protrusions. At least a portion of the protrusions is spaced from the cutting edge such this portion protrudes, along a plane perpendicular to the relief surface and passing through the cutting edge, in a direction transverse to the relief surface beyond the cutting edge. At least the projecting portion of at least one of the protrusions is constructed so as to deform the workpiece before its contact with the cutting edge.

Another example, also as set forth by the applicant himself is WO11001438, which discloses a cutting element for use in a cutting operation, comprising a cutting edge (CE) capable of cutting out material from a workpiece during the operation, to form therein a workpiece corner of angle alpha. There exists at least one view of the cutting edge in which a portion of the cutting edge is delimitable by a first (L1) and a second (L2) line oriented tangentially to the portion of the cutting edge portion at respective tangency points A and B. The lines form therebetween a cutting angle corresponding to the workpiece corner angle alpha and have a vertex 0. For a bisector of the cutting angle intersecting the portion of the cutting edge at the point C, the projection C of the point C of the portion of the cutting edge on a line OL passing through the vertex 0 perpendicularly to the plane of the one view is located between projections A1 and B' of the respective points A and B of the portion of the cutting edge on the line OL.

It is also known to provide an auxiliary cutting element positioned on the relief surface and configured for removing additional material, on top of that removed by the main cutting edge of the cutting tool. One such example is set forth by the applicant himself in WO13175478A2 which discloses a method for designing a cutting edge of a cutting element configured for removing material from a workpiece to leave therein a desired end profile. The method comprises the steps of modeling a desired end profile of the workpiece, the profile having a longitudinal axis and being defined by a bottom surface, a side surface and an adjoining surface extending therebetween; defining a lead profile plane and an trail profile plane spaced therefrom, each of the planes being oriented perpendicular to the longitudinal axis; determining a profile contour defined by the intersection line between the end profile and the lead profile plane. The contour profile includes a bottom contour defined as the intersection line between the lead profile plane and the bottom surface, an adjoining contour defined as the intersection line between the lead profile plane and the adjoining surface, and a side contour defined as the intersection line between the lead profile plane and the side surface; designing a rake surface and a relief surface, the intersection line between which defines a cutting edge lying in the adjoining surface and spanning between the lead profile plane and the trail profile plane. The cutting edge is designed such that in any reference plane oriented perpendicular to the cutting edge, the intersection between each of the rake surface and the relief surface with the reference plane defines a respective rake line and relief line, the angle between the lines being equal to or smaller than a similar angle taken along each of a plurality of similar reference planes disposed between the reference plane and the lead profile plane Acknowledgement of the above references herein is not to be inferred as meaning that these are in any way relevant to the patentability of the presently disclosed subject matter.

GENERAL DESCRIPTION

In accordance with one aspect of the subject matter of the present application there is provided a cutting member comprising a cutting edge defining a cutting envelope configured for removing material from a workpiece leaving therein a corner of angle α, said cutting edge comprising:
  a first cutting segment and a second cutting segment spaced from the first cutting segment, wherein respective first and second imaginary tangents of said first and second cutting segments intersect one another at point O located outside the cutting envelope, forming an angle corresponding to angle α, thereby defining a cutting frame at least a portion of which extends beyond the cutting envelope;
  an adjoining cutting segment, extending between and bridging said first cutting segment and said second cutting segment, and at least partially contained within the cutting frame; and
  at least one auxiliary cutting element comprising an auxiliary cutting edge extending generally along one of said imaginary tangents and beyond said cutting envelope;
wherein said auxiliary cutting edge does not intersect the other of said imaginary tangents and/or a bisector of said angle α.

It should be understood that the definitions used above refer to a view/projection of the cutting member tangent to the cutting direction of the envelope, i.e. normal to a plane perpendicular to the cutting envelope.

The auxiliary cutting element can be associated with either of the first and the second cutting segment. In addition, the cutting member can be provided with more that one auxiliary element, so that one auxiliary cutting element can be configured for operation in conjunction with the first segment and a first portion of the adjoining segment and a second auxiliary cutting element can be configured for operation with the second segment and the second portion of the adjoining segment.

Each corner can be divided into: a first zone defined between the first segment, a first portion of the adjoining segment, the bisector and the tangent to the first segment, and a second zone defined between the second segment, a second portion of the adjoining segment, the bisector and the tangent to the second segment, and wherein the cutting edge of the auxiliary cutting element associated with the first zone does not penetrate into the second zone and vise versa.

The cutting member can comprise two auxiliary cutting elements, each having an auxiliary cutting edge, wherein the auxiliary cutting edges do not form together a full contour around the cutting envelope of the cutting edge.

The arrangement can be such that each of the cutting segments of the cutting member is provided with an auxiliary cutting element.

In addition, the auxiliary cutting edge can have a leading end and a trailing end, and the distance between the leading end and the trailing end can shorter than the distance between the leading end and the cutting segment with which the auxiliary cutting edge is associated. This allows the auxiliary cutting edge to be considerably short, thereby reducing friction load exerted thereon, reducing heat wear and other harmful effects.

Further, the adjoining segment of the cutting edge can take on various shapes. In accordance with one example, the shape of the adjoining segment can be a concave shape. Alternatively, according to another example, the adjoining segment of the cutting edge can have a first portion which is concave and a second portion which is convex.

Moreover, the concave portion of the adjoining segment can correspond to the feed direction of the cutting member. In particular, the concave portion can be that portion of the adjoining segment provided with the auxiliary cutting element.

In accordance with a particular example, the cutting element, and in particular its cutting edge can extend beyond the cutting frame.

According to a specific example, the cutting edge can be provided with two auxiliary cutting elements, each having an auxiliary cutting edge, wherein there extends a channel between the auxiliary cutting edges configured for passage of material from the workpiece.

The cutting member can be configured for performing any one of the following: turning, milling, drilling and parting.

According to one example, the cutting member can be a cutting insert configured for mounting onto a holder for forming a cutting tool. Alternatively, the cutting member can be constituted by a portion of an integral cutting tool.

According to another aspect of the subject matter of the present application, there is provided a cutting tool comprising a cutting member according to the previous aspect of the subject matter of the present application.

The cutting tool can be a milling tool comprising a plurality of cutting portions, each cutting portion constituting a cutting member. In particular, the auxiliary cutting element of one cutting portion of the tool can be configured for removing material from a first portion of the workpiece and the auxiliary cutting element of a consecutive cutting portion is configured for removing material from a second portion of the workpiece.

Thus, in the cutting portions of the milling tool, the auxiliary cutting elements alternates from one cutting portion to the next, one removing material from the bottom of the workpiece (for example) and the other from the side of the workpiece.

According to a further aspect of the subject matter of the present application there is provided a method for removing material from a workpiece using the cutting member or cutting tool of the previous aspects, the method comprising the steps of:

a) removing material from the workpiece with the cutting edge, leaving therein a profile corresponding to the cutting envelope of the cutting member;

b) forming a groove within the workpiece using the auxiliary cutting edge thereby, extending outside the envelope, leaving a profile within the workpiece different than the profile of the envelope; and c) repeating steps (a) and (b).

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 13A is a schematic isometric view of another example of a milling tool according to the subject matter of the present application;

DETAILED DESCRIPTION OF EMBODIMENTS

Turning now to FIGS. 1A to 1E, a standard corner cutting process is demonstrated. In particular, a cutting tool C.T. is formed with a cutting corner C.C. configured for cutting into a workpiece WP.

Figure 1A:
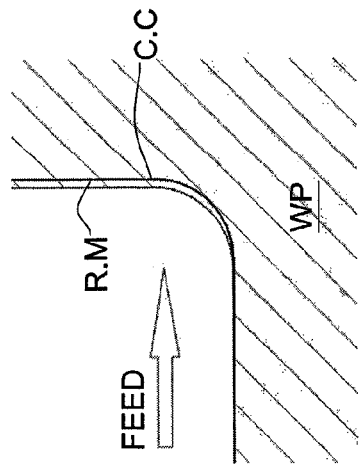
FIG. 1A to 1E are schematic section views of a cutting corner of a cutting tool according to the prior art, shown during various stages of a cutting operation.
Figure 1B:
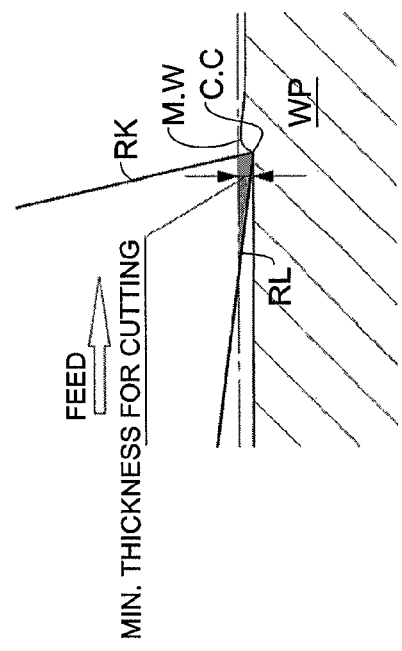

As shown in FIG. 1B, the cutting tool C.T. progresses in the feed direction F in order to continuously remove material R.M. from the workpiece. However, it is noted that since the cutting tool C.T. progresses rightwards and not downwards, the amount of material removed by the front portion of the cutting corner C.C. is greater than the amount of material removed by a bottom portion of the cutting corner C.C.

Specifically, whereas the thickness of the chip removed by the front portion is determined by the feed F, it gradually reduces its thickness towards the bottom portion until it reaches zero (i.e. the relief of the cutting tool coming in contact with the workpiece WP).

Figure 1C:
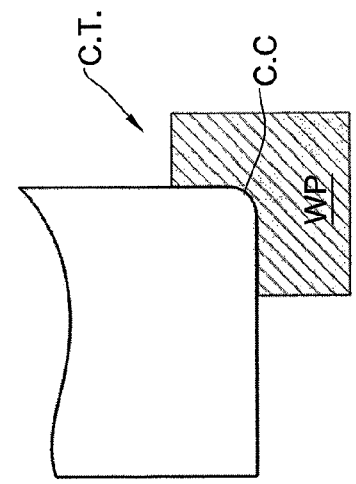
Figure 1D:
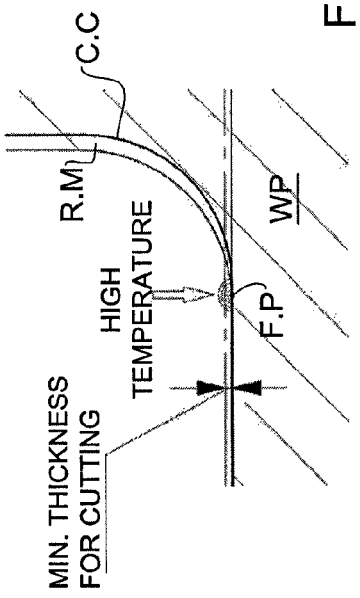
Figure 1E:
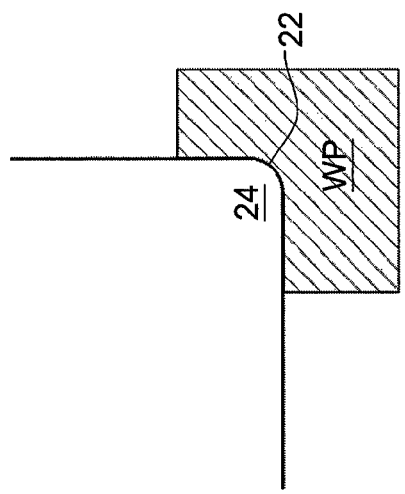

Turning to FIG. 1C, it is observed that when the thickness of the chip is smaller than a predetermined minimal thickness, the cutting corner C.C. can no longer remove the material and simply pushes it forward, generating a considerable amount of heat, centered at the lower end of the cutting corner C.C. FIG. 1D demonstrates the material wave M.W. which is generated by the cutting corner C.C.

Reference is now made to FIGS. 2A to 2H, in which a cutting tool of the present application generally designated as 1 is shown during operation on the workpiece. In particular, the cutting tool 1 comprises a main cutting portion 20 and an auxiliary cutting portion 30, configured to relieve some of the stresses generating by the above described problem.

As shown in the diagrams, once the cutting corner 22 removes material from the workpiece WP, an auxiliary cutting corner 32 follows which cuts a partial slit in the workpiece WP, partially lifting a chip C1, and leaving a gap g in the workpiece.

Thereafter, when the cutting corner 22 again comes into contact with the workpiece (FIG. 2C), its interaction with the workpiece takes place in three different regions:

the front region which is similar to that of the standard cutting tool C.T. previously discussed;

a chip removing region in which the cutting edge 22 interacts with the chip C1 lifted by the auxiliary edge 32; and a bottom region in which the bottom portion of the cutting edge 22 faces a space (airgap) g, created by the auxiliary edge 32 preceding it.

It also follows from the diagrams 2D to 2H, that following this initial stage, the cutting edge 22 will now remove, in each iteration, the remainder of the chip removed by the auxiliary cutting edge 32.

One of the main concepts embodied in the above design lies in the reduction of the loads exerted on the cutting insert as a result of attempting to remove material below a predetermined minimal thickness. Specifically, the present design allows reducing the loads by assuring that the tangent portion F.P. of the cutting edge does not come in contact with material, this being achieved by the removal of material by the auxiliary cutting edge.

Another point which should be noted is that the auxiliary cutting edge 32 itself, is also prevented from the material wave M.W. effect since, once the slit within the workpiece is made, the auxiliary cutting edge 32 always penetrates the material and never 'scrapes' against it.

Figure 2B:
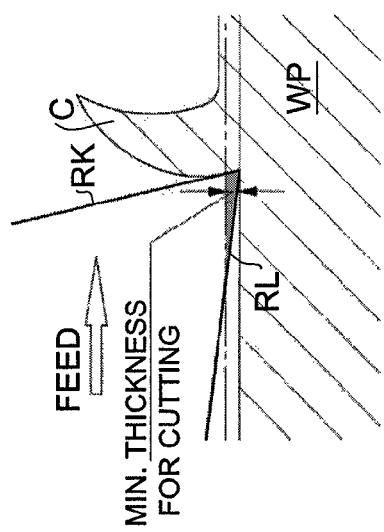
FIG. 2A to 2G are schematic section view of a cutting corner of a cutting tool according to the subject matter of the present application, shown during various stages of a cutting operation.
Figure 2A:
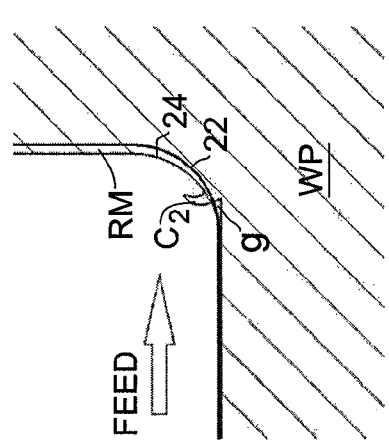
Figure 2C:
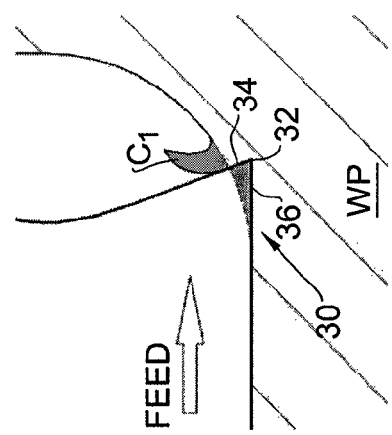
Figure 2D:
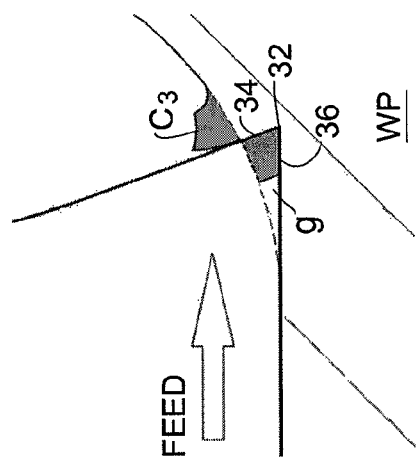
Figure 2E:
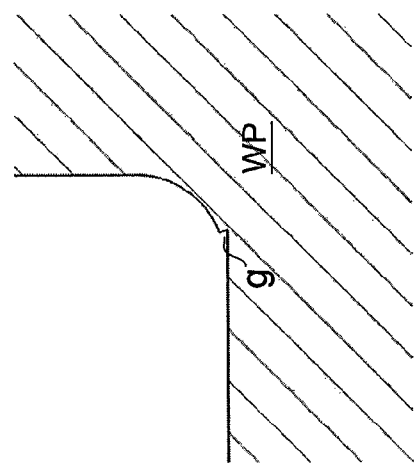
Figure 2F:
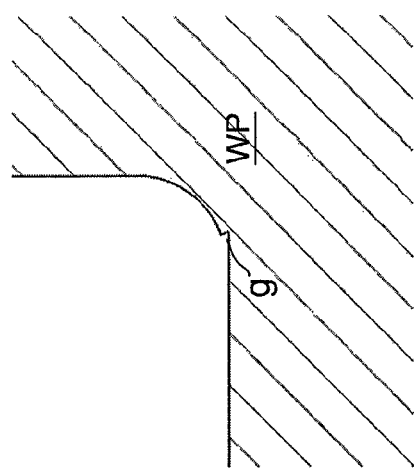
Figure 2G:
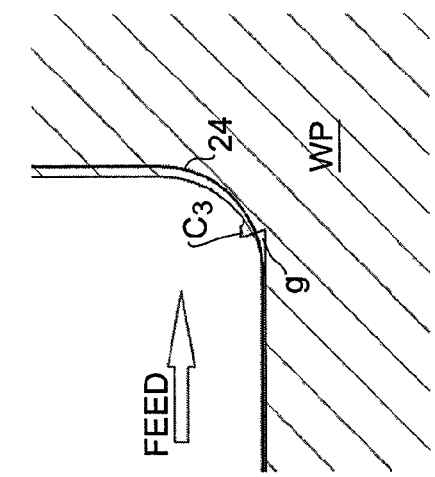
Figure 2H:
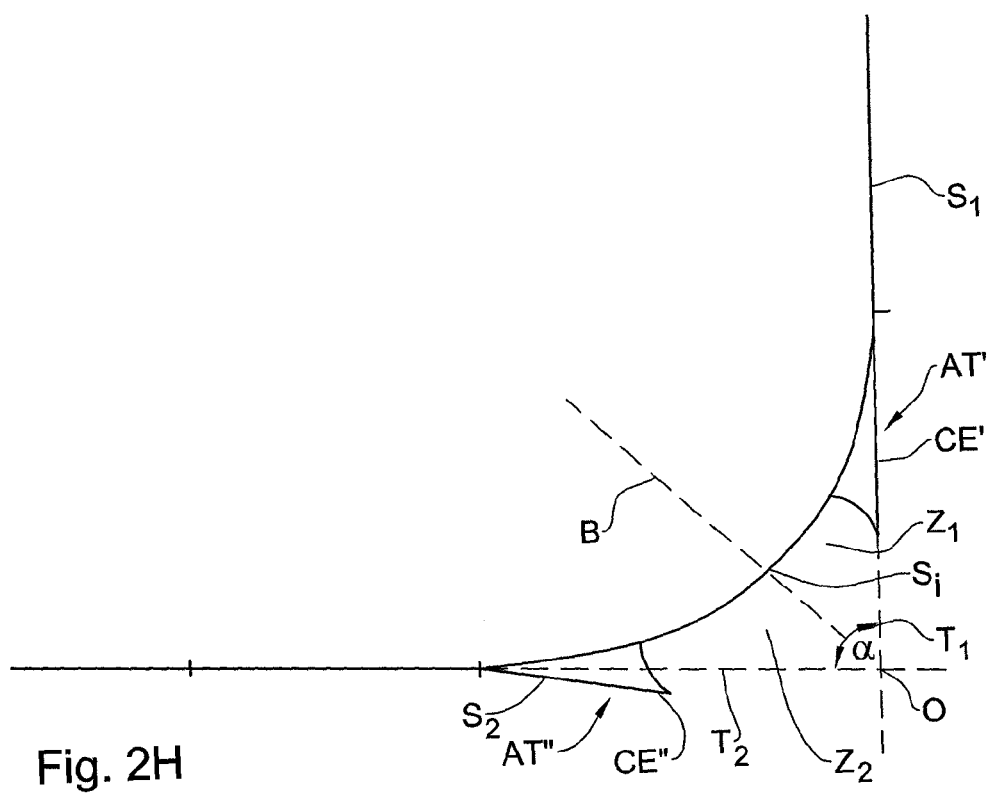
FIG. 2H is a schematic section view of a cutting corner of a cutting tool according to the subject matter of the present application.

With particular reference being made to FIG. 2H, it is observed that the cutting tool C.T. has a first cutting edge segment S1 and a second cutting edge segment S2, the tangents of which T1 and T2 respectively, intersect at point O and form an angle α therebetween. The cutting tool C.T. also has an intermediate or adjoining cutting edge segment Si which bridges between the segments S1, S2, the three segments together form a cutting envelope.

With respect to the bisector B of the angle α, two cutting zones can now be defined: Z1—the area inscribed between a first portion of the bridging cutting edge segment Si, the bisector B and the tangent T1, and Z2—the area inscribed between a second portion of the bridging cutting edge segment Si, the bisector B and the tangent T2.

The cutting tool C.T. is shown with two different examples of auxiliary cutting elements (also referred herein as 'cutting teeth'), AT' and AT". These are two examples shown on the same cutting tool though it should be understood that each of them can be used separately and they are shown on the same cutting tool merely for convenience purposes.

The auxiliary cutting element AT' lies within zone Z1 and has an auxiliary cutting edge CE' extending generally along the tangent T1 and contained within zone Z1. The auxiliary element AT" lies partially outside the zone Z2 and has an auxiliary cutting edge AT" which lies completely outside the zone Z2.

However, in both cases, it is observed that none of the auxiliary cutting edges CE' and CE" extends so as to intersect the bisector B, i.e. it does not constitute a complete cutting edge which reaches all the way to the corner O.

Several cutting tools will now be described, demonstrating the above principles of partial cutting of the workpiece.

Attentions is drawn to FIGS. 3A to 3E, in which a milling tool is shown, generally designated as 1 and comprising a shank 10 and four cutting portions 20, each having a cutting edge 22 and an auxiliary cutting element 30.

Figure 3A:
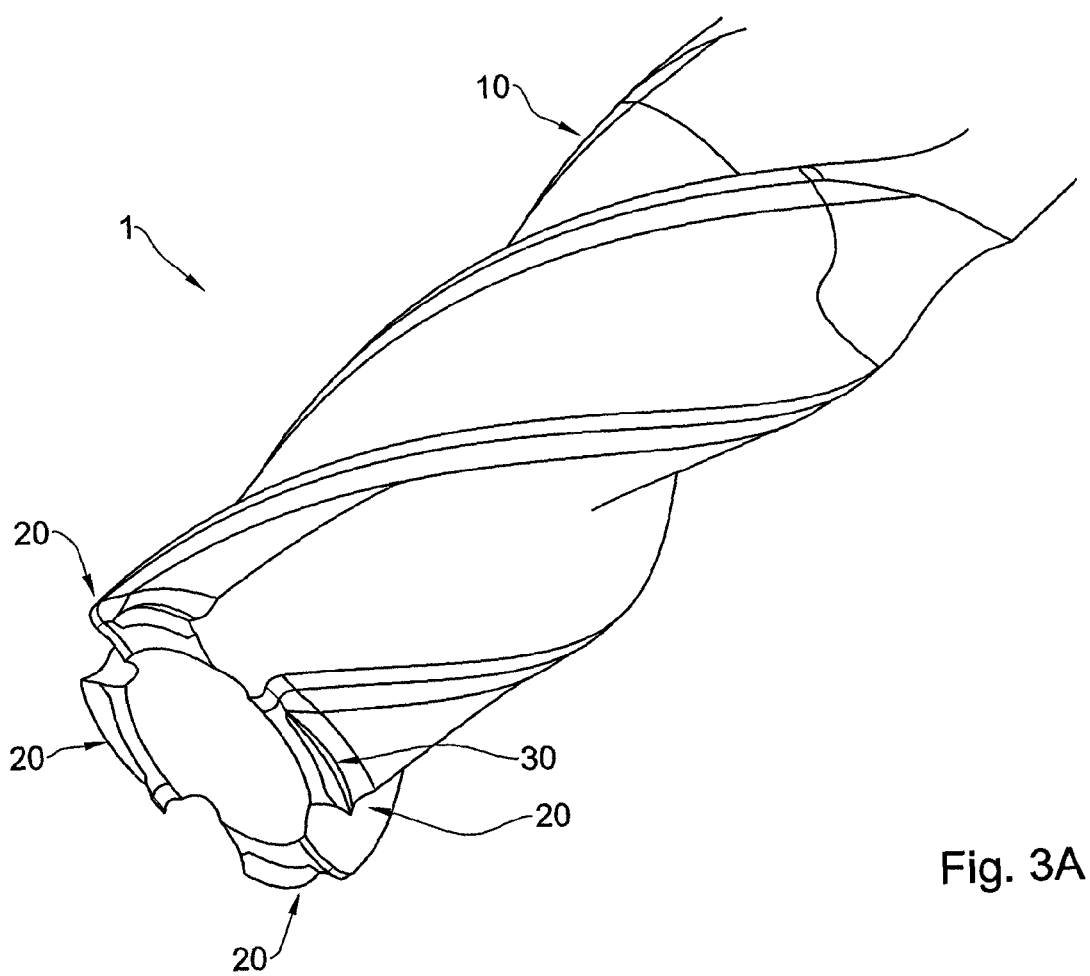
FIG. 3A is a schematic isometric view of a milling tool according to the subject matter of the present application.
Figure 3B:
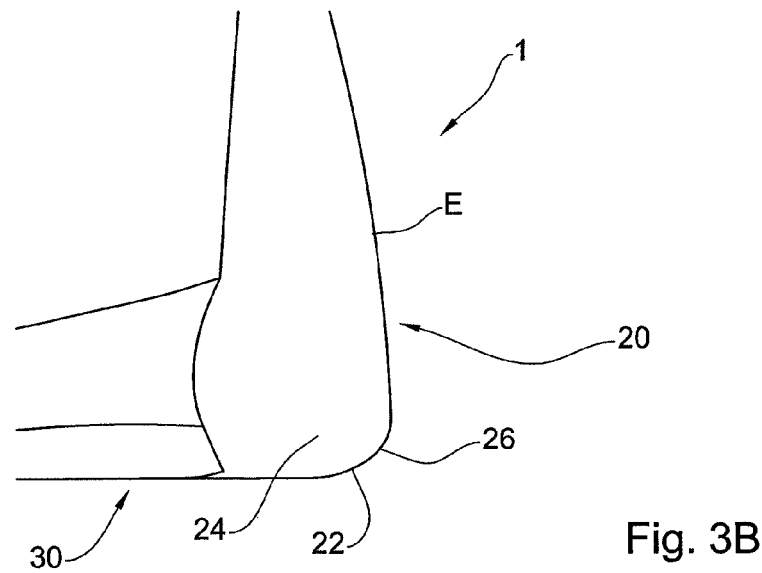
FIGS. 3B to 3D are schematic front views of the cutting tool shown in FIG. 3A, shown during various stages of a cutting operation.
Figure 3C:
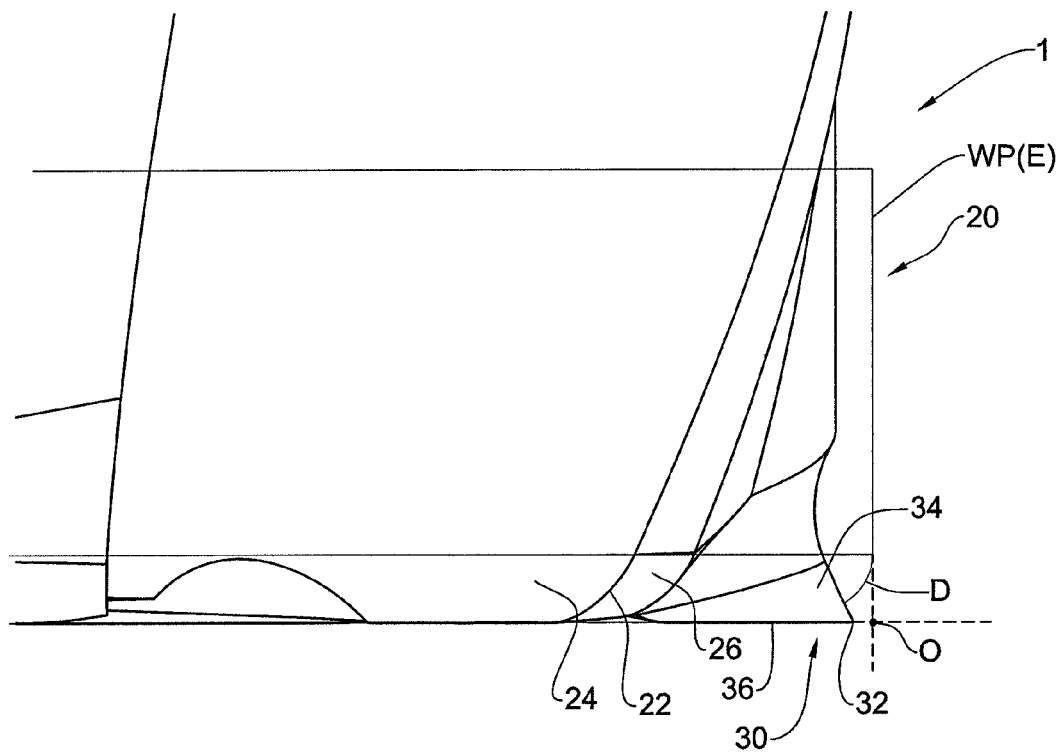
Figure 3D:
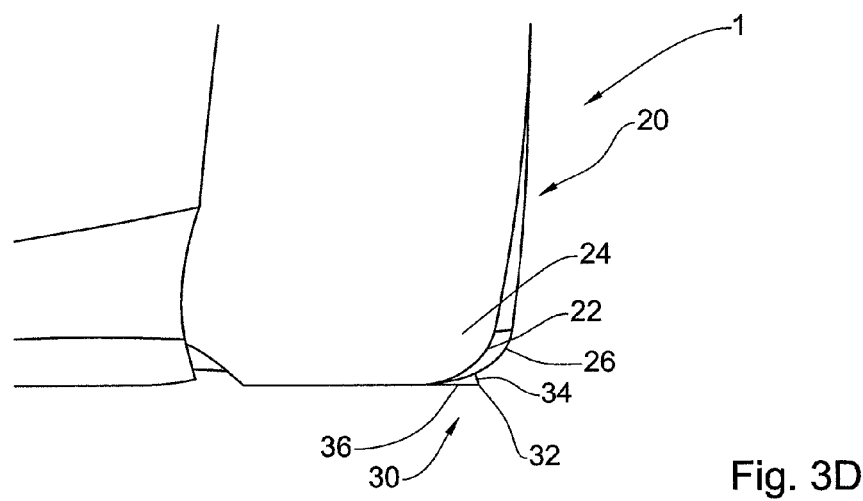

With particular reference being drawn to FIG. 3C, the auxiliary cutting element 30 is shown in operation. The cutting portion 20 has a cutting edge 22 defined at the intersection between a rake surface 24 and a relief surface 26. Once it has passed within the workpiece, it leaves therein a profile P.

Thereafter, as the milling tool 1 revolves, the auxiliary cutting edge 32 of the auxiliary cutting portion 30 comes into contact with the workpiece and further carves into the workpiece WP. It is observed that the auxiliary cutting edge 32 does not extend all the way to the intersection point O but since it projects outside the cutting envelope, it also projects outside the profile P, allowing it to carve into the workpiece.

Figure 3E:
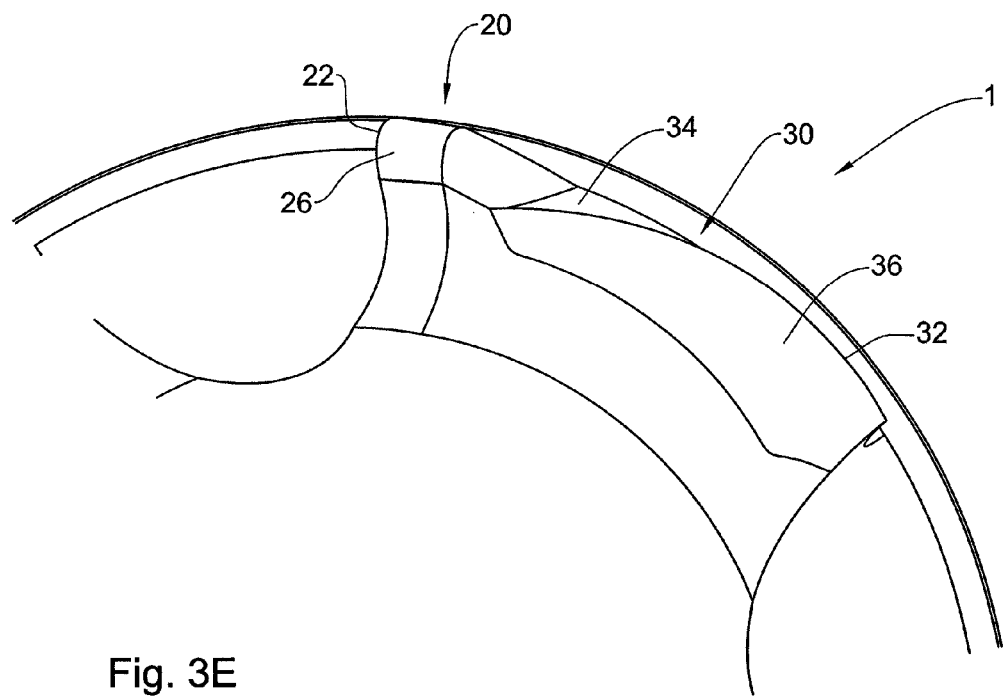
FIG. 3E is a schematic bottom view of a cutting corner of the cutting tool shown in FIGS. 3A to 3D.
Figure 4A:
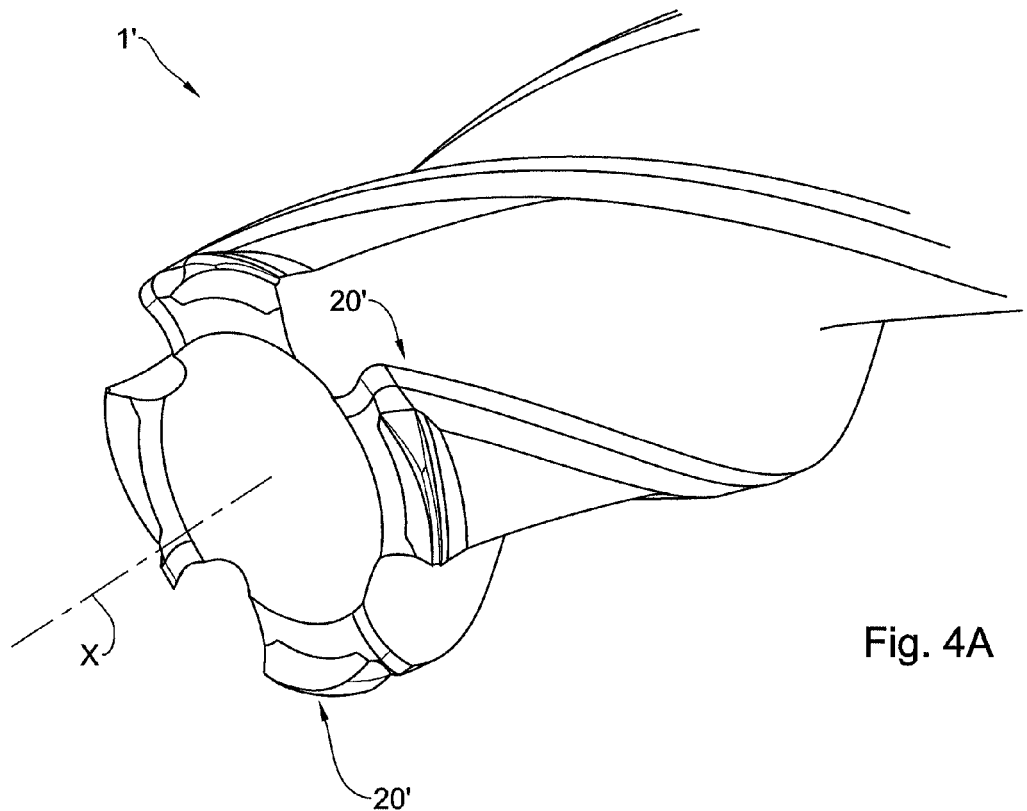
FIG. 4A is a schematic isometric view of another example of a milling tool according to the subject matter of the present application.
Figure 4B:
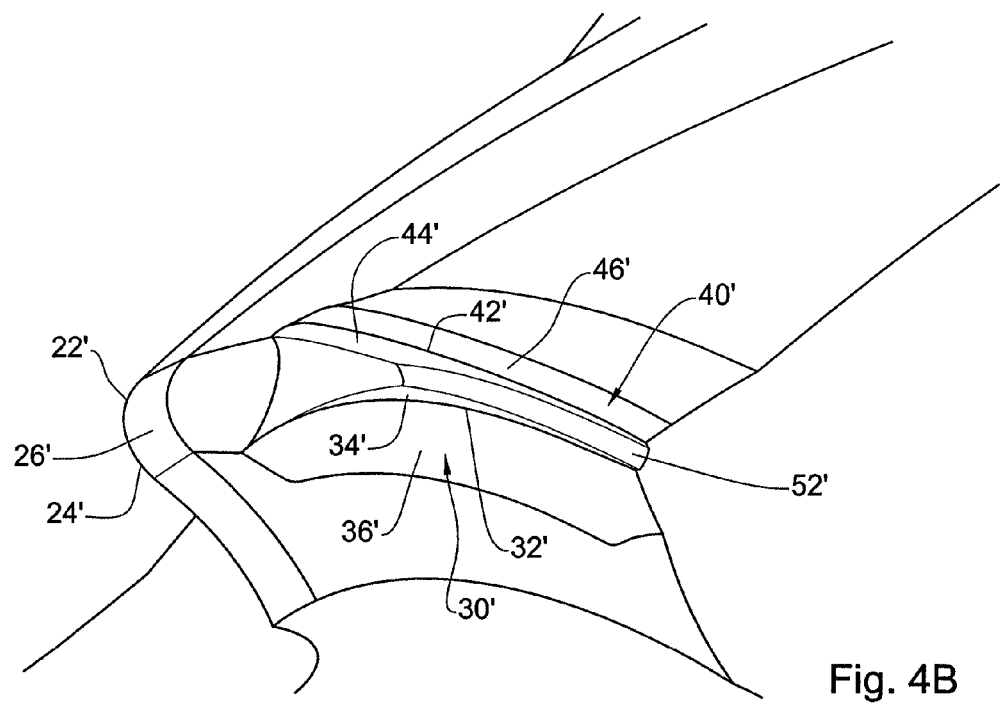
FIG. 4B is a schematic enlarged view of a portion of the cutting tool shown in FIG. 4A.
Figure 4C:
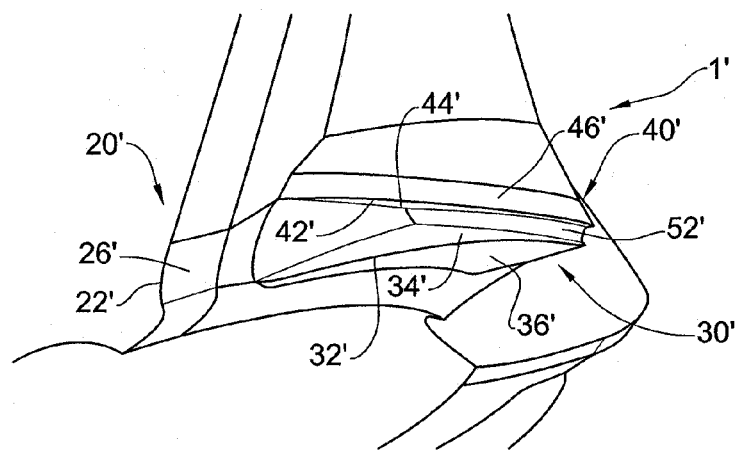
FIG. 4C is a schematic enlarged view of another portion of the cutting tool shown in FIG. 4A.
Figure 4D:
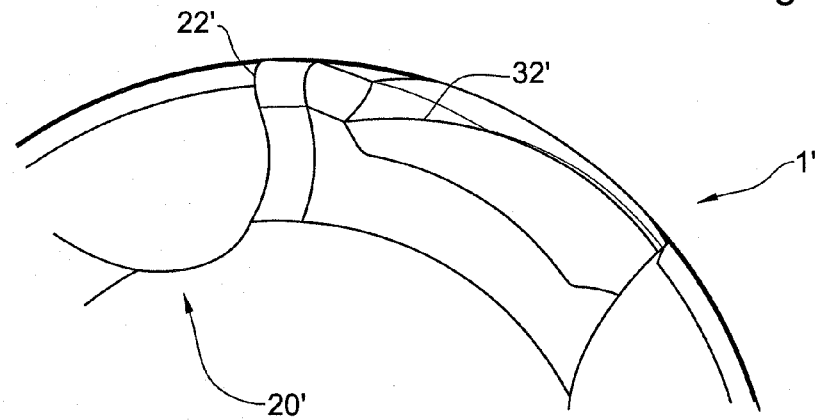
FIG. 4D is a schematic bottom view of a portion of the cutting tool shown in FIG. 4A.
Figure 4E:
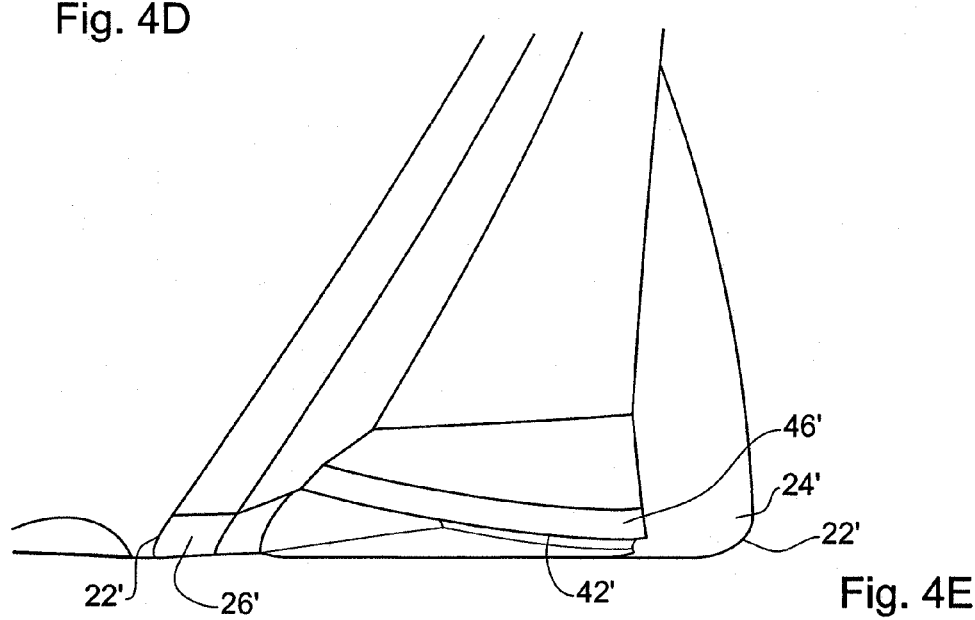
FIG. 4E is a schematic side view of the portion shown in FIG. 4C.

As observed from FIG. 3E, the auxiliary cutting edge 32 (also defined as the intersection between its rake and relief surfaces 34, 36 respectively) has a smaller inscribing circle, and does not reach the outer perimeter of the envelope of the main cutting edge 22.

The milling tool 1 is intended for performing its function during lateral movement of the milling tool 1, and, in this particular example, will not contribute in case of axial displacement of the milling tool.

Turning now to FIGS. 4A to 4E, a similar milling tool is shown generally designated as 1', but with the difference of having two auxiliary teeth 30', 40' for each cutting portion 20'. Thus, this cutting tool 1' is configured both for lateral operation and axial operation, the cutting edges 32', 42' carving into the side and bottom of the workpiece respectively.

It is observed that between the auxiliary teeth 30', 40' there is formed a channel 52', configured for channeling part of the material removed from the workpiece during operation of the milling tool 1'.

Figure 5A:
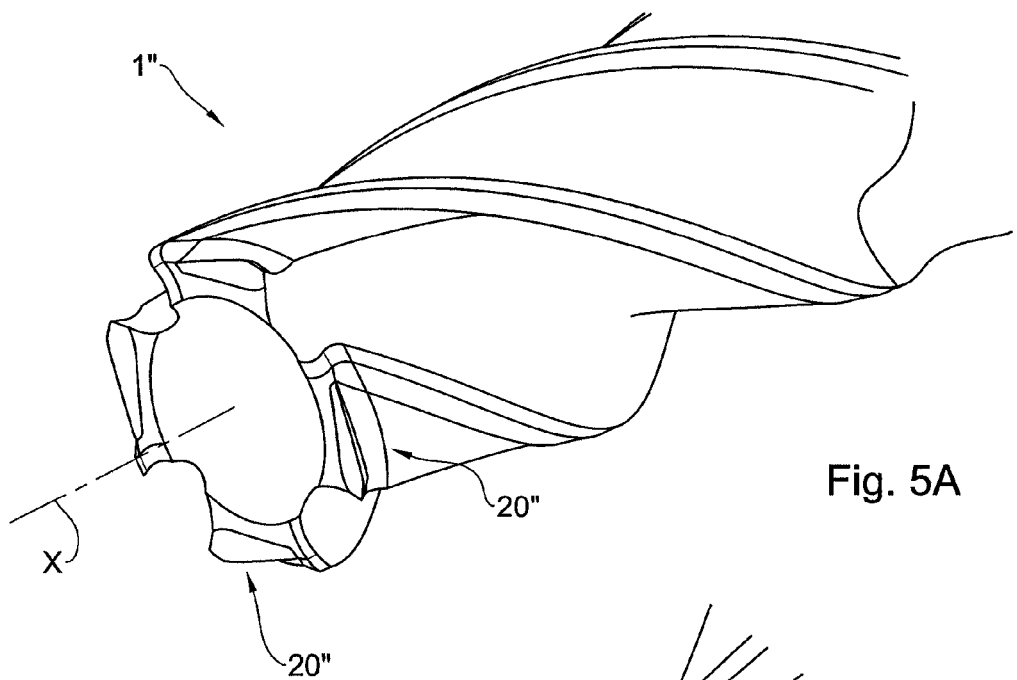
FIG. 5A is a schematic isometric view of another example of a milling tool according to the subject matter of the present application.
Figure 5B:
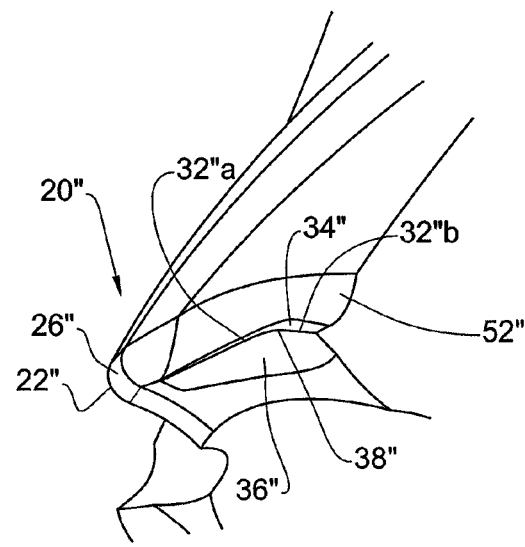
FIG. 5B is a schematic enlarged view of a portion of the cutting tool shown in FIG. 5A.
Figure 5C:
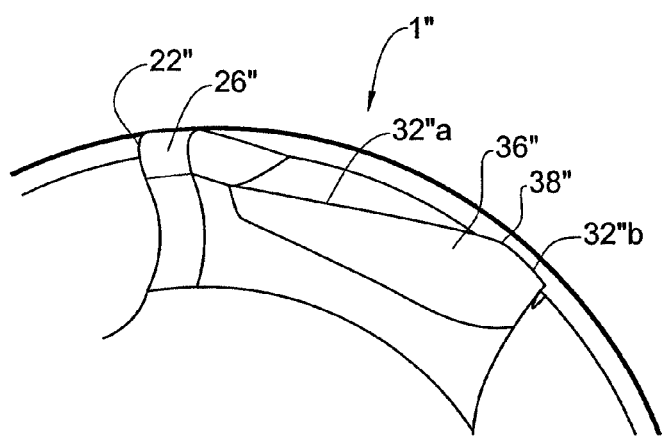
FIG. 5C is a schematic bottom view of a portion of the cutting tool shown in FIG. 5A.
Figure 6A:
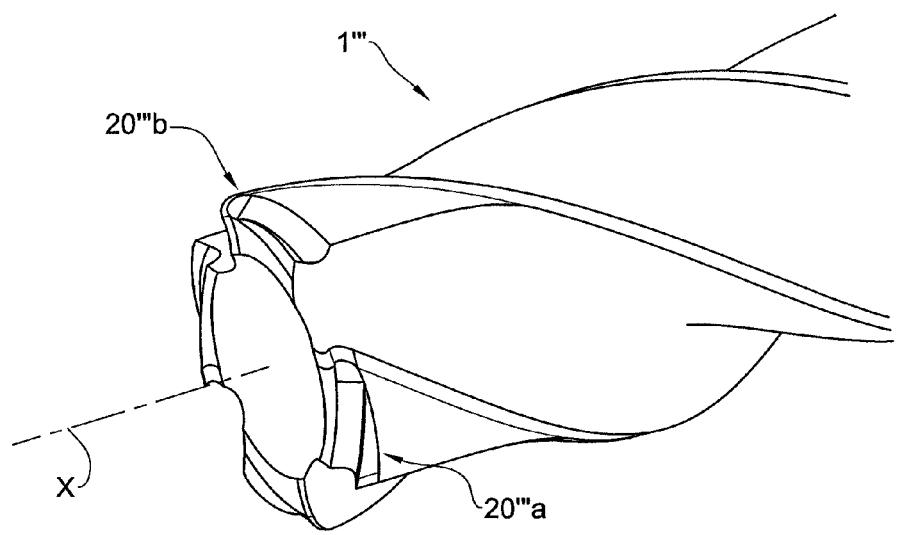
FIG. 6A is a schematic isometric view of another example of a milling tool according to the subject matter of the present application.
Figure 6B:
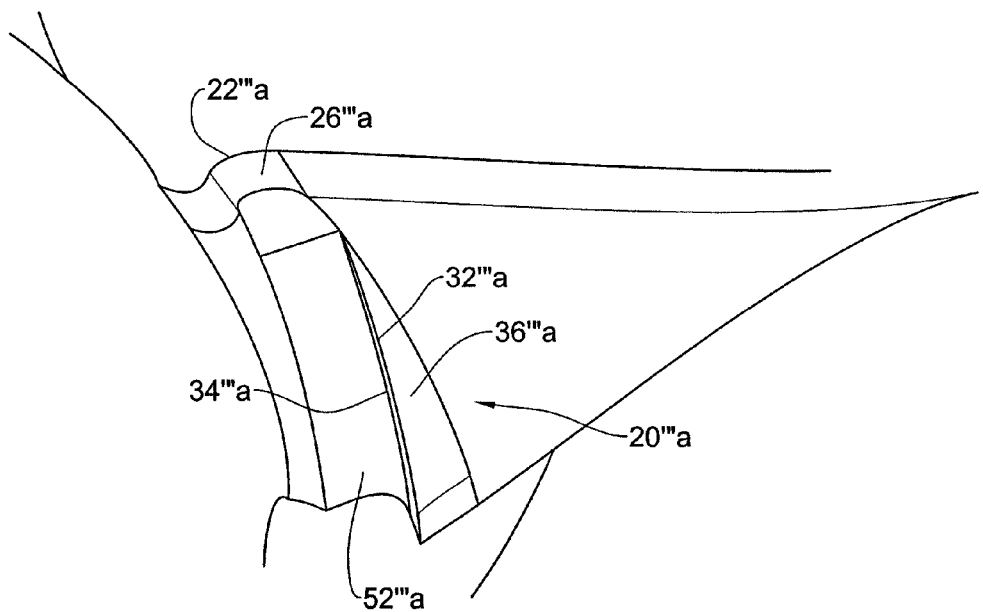
FIG. 6B is a schematic enlarged view of a portion of the cutting tool shown in FIG. 6A.
Figure 6C:
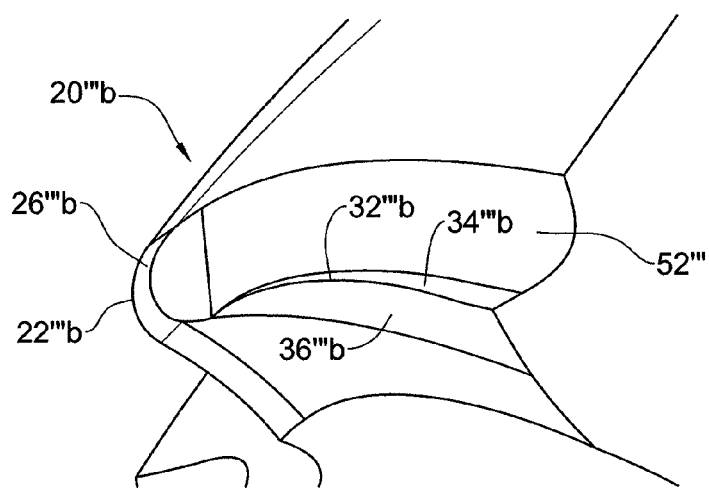
FIG. 6C is a schematic enlarged view of another portion of the cutting tool shown in FIG. 6A.
Figure 6D:
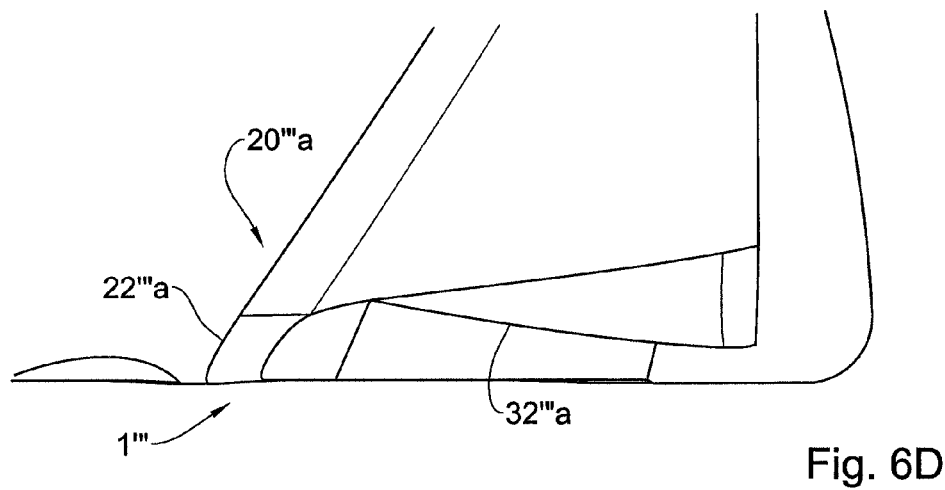
FIG. 6D is a schematic front view of the portion shown in FIG. 6C.
Figure 6E:
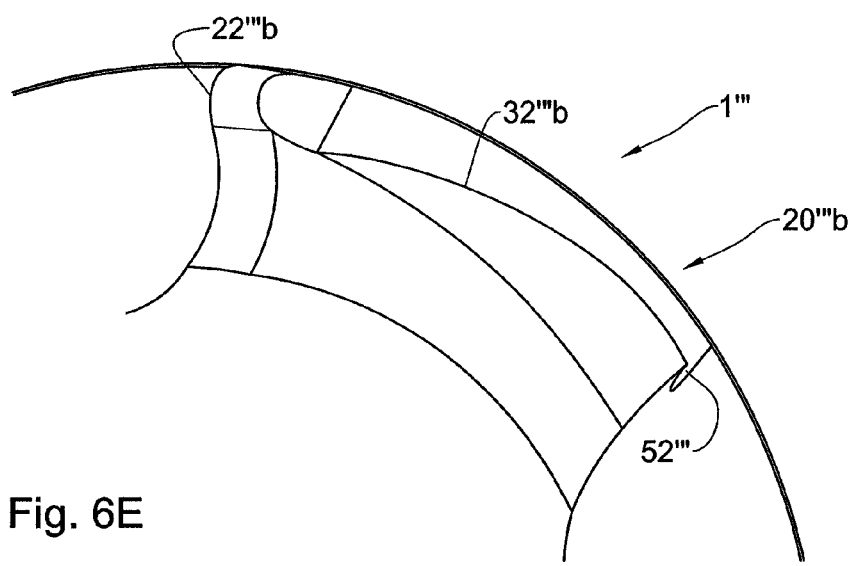
FIG. 6E is a schematic bottom view of a portion of the cutting tool shown in FIG. 6A.

Attention is now drawn to FIGS. 5A to 5C, in which yet another example of a milling tool is shown, generally designated 1", which is similar to the milling tools 1 and 1'.

However, the difference between the cutting tool 1" and the previously described cutting tools lies in the fact that the auxiliary cutting edge 32" has a curve point 38" in which the auxiliary cutting edge recedes inwards, dividing the auxiliary cutting edge 32" into a first portion 32$a$" and 32$b$". This is performed in order to prevent friction between the tail end of the auxiliary cutting edge 32" and the workpiece, an effect similar to that generated between the regular cutting edge 22" and the workpiece.

Attention is now drawn to FIGS. 6A to 6E, another milling tool is shown, generally designated as 1''', which is generally similar to previously described milling tools 1, 1' and 1".

The difference between the milling tool 1''' and the milling tools 1, 1' and 1" is that the cutting portions 20''' thereof alternate so that one cutting portion 20''' is formed with an auxiliary tooth 30''' configured for carving the bottom portion of the workpiece and the subsequent cutting portion 20''' is formed with an auxiliary tooth 30''' configured for removing material from a side of the workpiece.

Thus, the cutting edges 32''' alternate, still allowing the cutting tool 1''' to perform both axially and laterally (i.e. move both sideways and up-down).

In all of the above examples, similar reference numerals are used to denote similar features of the tools, e.g. cutting edge 30 is similar to cutting edge 30', 30" and 30''' and so forth.

Figure 7A:
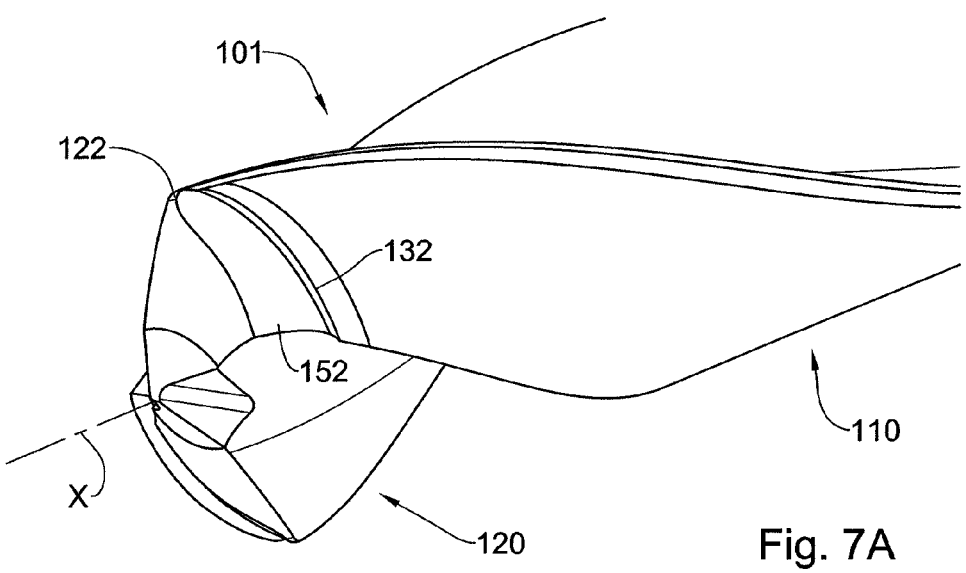
FIG. 7A is a schematic isometric view of a drilling tool according to the subject matter of the present application.
Figure 7B:
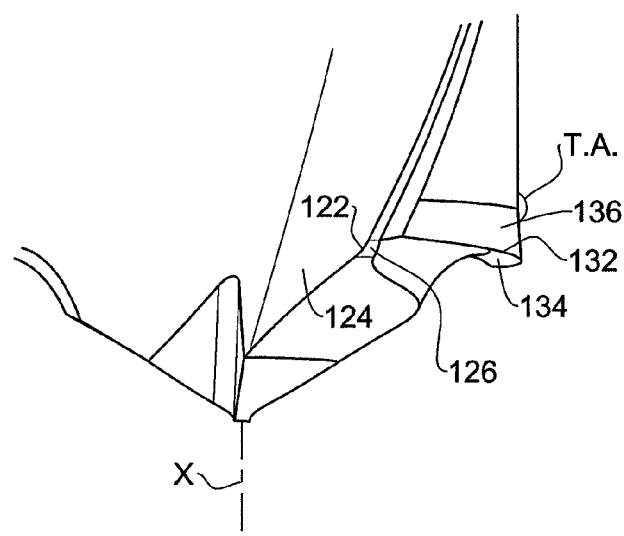
FIGS. 7B and 7C are schematic enlarged front views of a portion of the drilling tool shown in FIG. 7A, during various stages of the cutting operation.
Figure 7C:
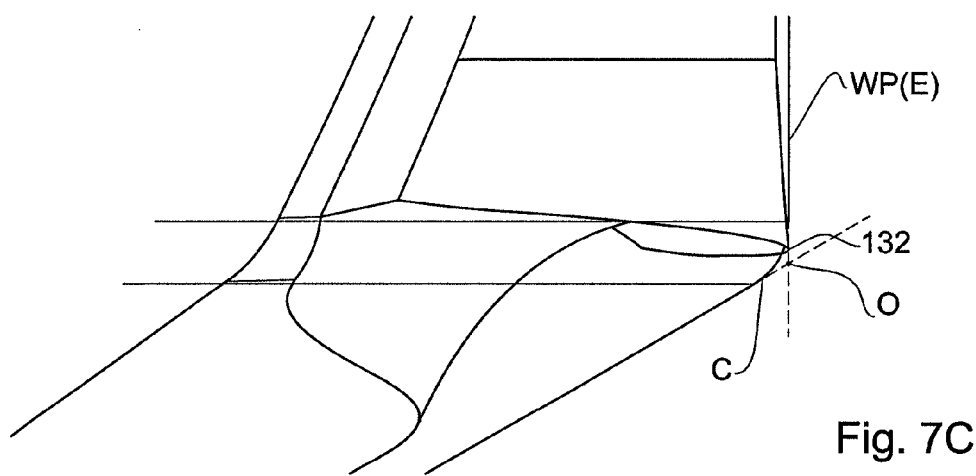

Attention is now drawn to FIGS. 7A to 7C, in which a drilling tool is shown generally designated as 101 and comprising a shank 110, a cutting portion 120 and an auxiliary cutting element 130.

The cutting portion 120 has a cutting edge 122 defined at the intersection between a rake surface 124 and a relief surface 126 and the auxiliary tooth 130 similarly has a cutting edge 132 defined at the intersection between a rake surface 134 and a relief surface 136.

Since the drilling tool 101 is configured (as many drills) to operate with a cutting angle of 120°, the auxiliary tooth 130 can extend outside the envelope and carve deeper into the workpiece during operation of the drilling tool 101.

Figure 8A:
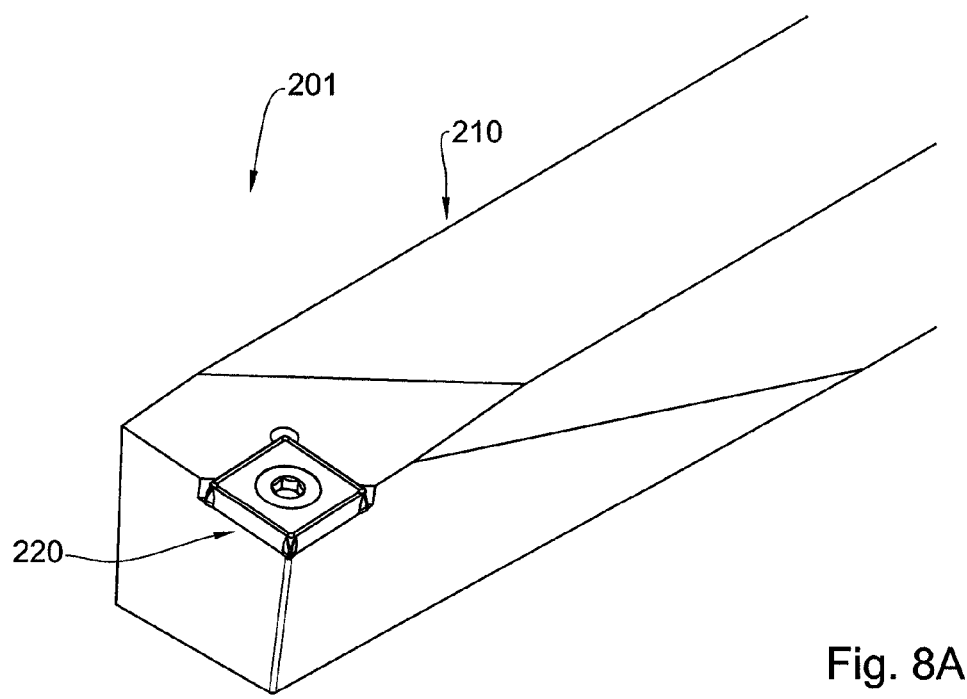
FIG. 8A is a schematic isometric view of a turning tool according to the subject matter of the present application.
Figure 8B:
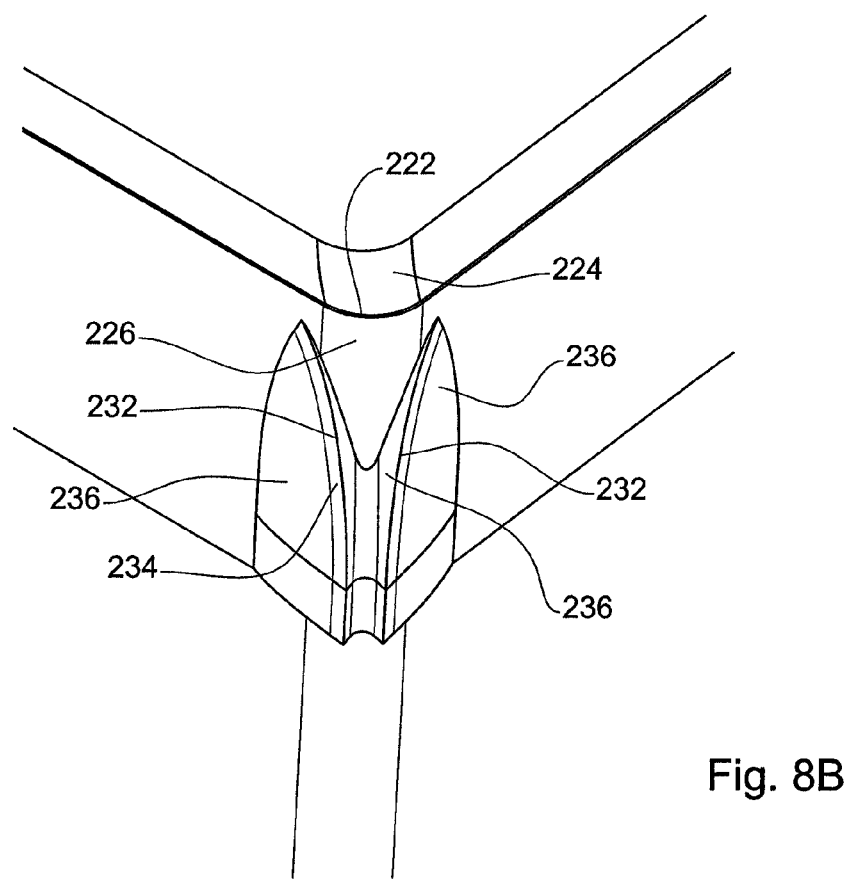
FIG. 8B is a schematic enlarged view of a portion of a turning insert used in the turning tool shown in FIG. 8A.
Figure 8C:
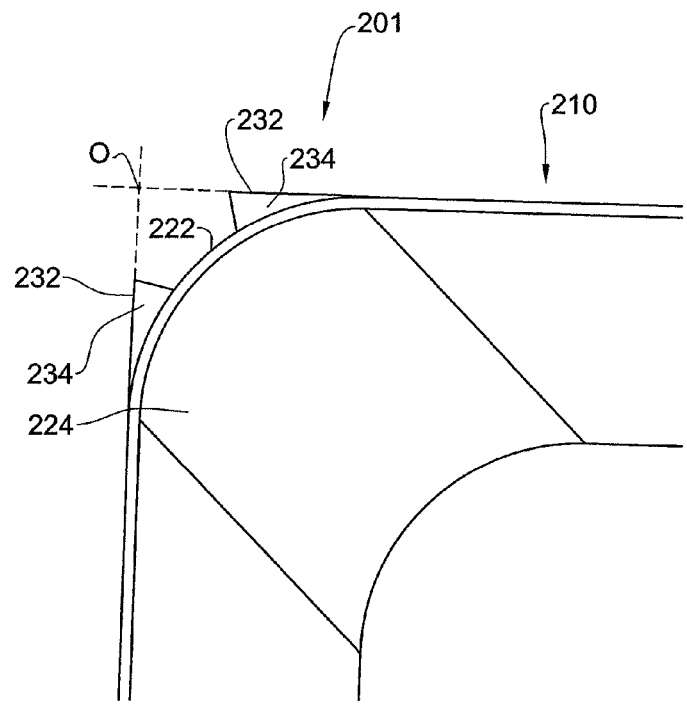
FIG. 8C is a schematic top view of the turning insert shown in FIG. 8B, positioned at an operative orientation.

Turning now to FIGS. 8A to 8C, a turning tool is shown generally designated a 201 and comprising a holder 210 and a cutting insert 220. The cutting insert 220 is formed with four cutting edges 222, each defined at a corner of the cutting insert 220 between a rake surface 224 and a relief surface 226.

Each corner is provided with two auxiliary teeth 230, each on one of the side walls defining the corner, the teeth having a cutting edge 232 defined at the intersection between a rake and a relief surface 234, 236 respectively.

This cutting insert 220 can be manufactured in a pressing process (in a mold) and, in operation, serves to carve the corner formed by the main cutting edge 222. It is appreciated that the greater the diameter of the workpiece, the better the operation of the auxiliary cutting teeth 230 and their cutting edges 232.

It is observed from FIG. 8C that the cutting edges 232 of the teeth 230 do not exceed the frame defined by the tangents of the cutting segments of the cutting edge 222, and that each of the edges 232 remains within its zone. It is also observed that the cutting edges 232 do not meet to form a closed contour, i.e. the cutting edges 232 alone cannot form a proper corner in the workpiece. This is true for all the tools described hereinbefore and hereinafter.

Thus, the auxiliary cutting edges 232 serve the purpose of carving the workpiece and preparing it for the main cutting edge 222, in order to prevent heating thereof which may be cause due to an insufficient cutting thickness/depth.

Figure 9:
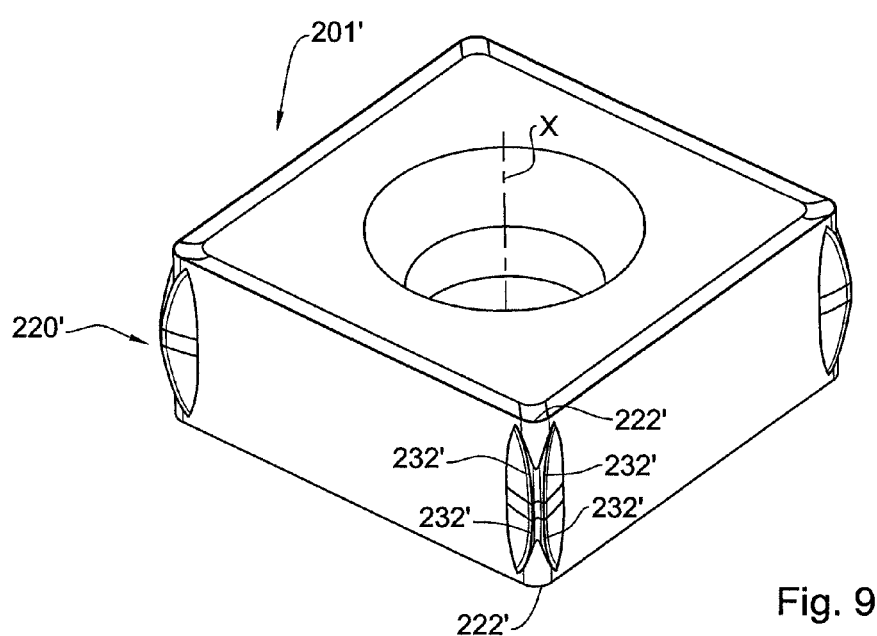
FIG. 9 is a schematic isometric view of another example of a turning insert for the turning tool shown in FIG. 8A.

Turning now to FIG. 9, a similar cutting insert 220' is shown, with the sole difference of having eight cutting edges 222 and not four. For this purpose, the auxiliary teeth 230' are designed symmetrically about a plane laterally crossing the cutting insert (perpendicular to the axis of the bore thereof).

Figure 10A:
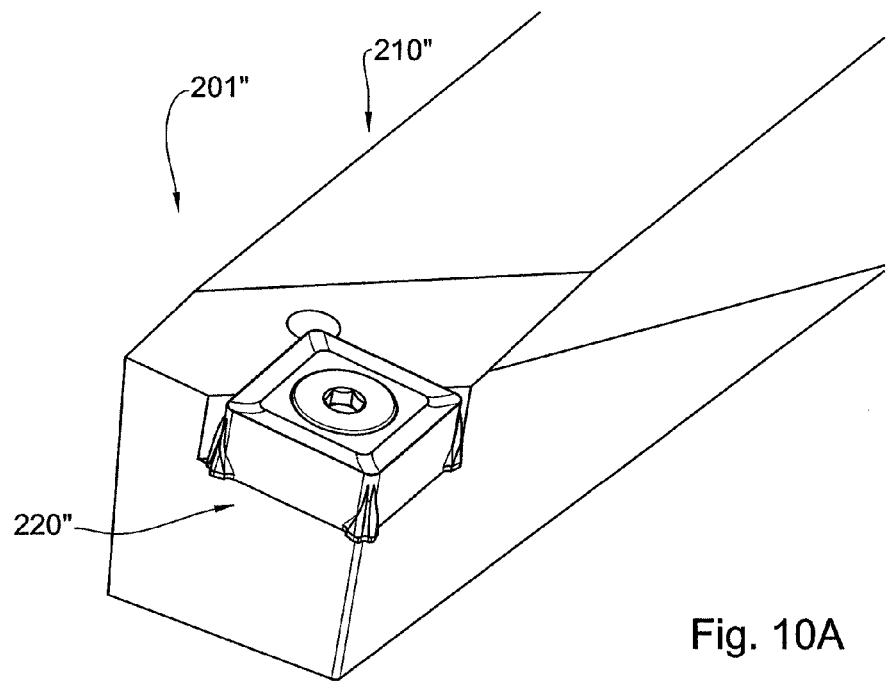
FIG. 10A is a schematic isometric view of another example of a turning tool according to the subject matter of the present application.
Figure 10B:
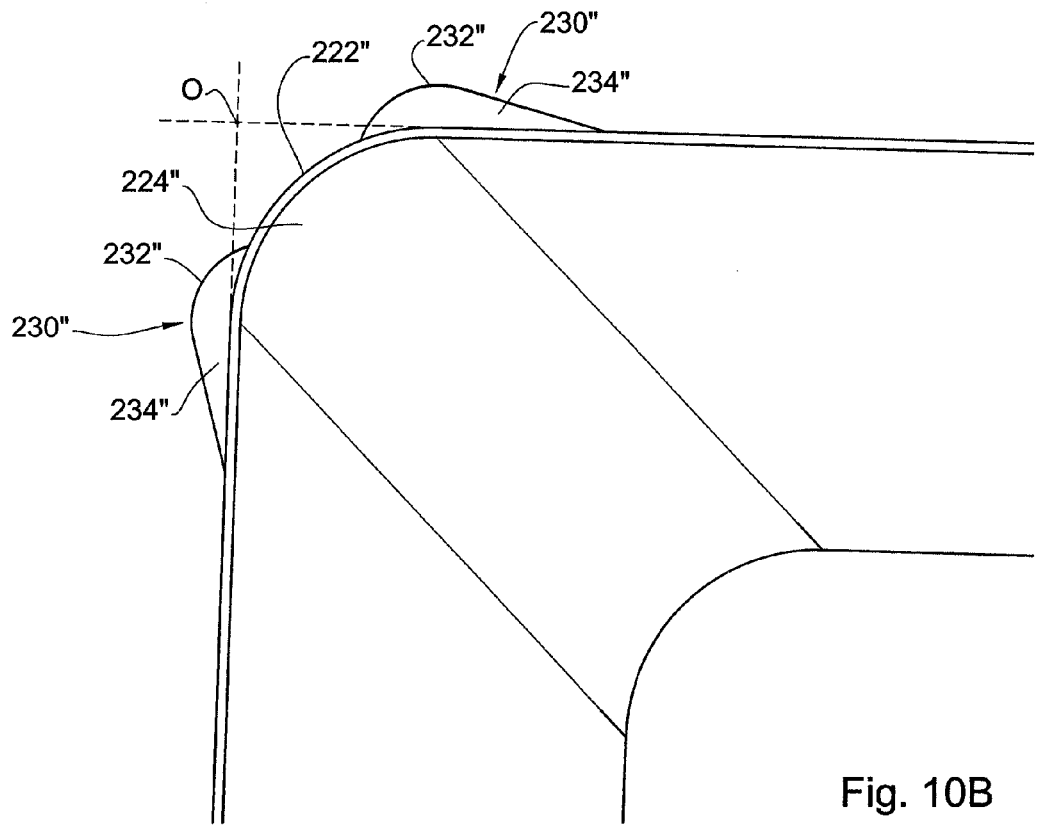
FIG. 10B is a schematic top view of the turning insert shown in FIG. 10A, positioned at an operative orientation.

Turning now to FIGS. 10A and 10B, another example of a turning tool 201" is shown, comprising a tool holder 210" and a turning insert 220". The difference lies in the design of the auxiliary teeth 230" which, in this case form two rounded projections beyond the cutting envelope of the cutting insert 220".

In this specific example, the auxiliary teeth 230" perform two functions: they both remove material from the workpiece similar to previously shown examples as well as protecting the tangent point of the cutting edge 222" (where the straight segment becomes curved). This point proves to be prone to failure but under the present example performs no work, and therefore considered to be 'protected'.

In all of the above examples, similar reference numerals are used to denote similar features of the tools, e.g. cutting edge 130 is similar to cutting edge 130', 130" and 230' etc. and so forth.

Attention is now drawn to FIGS. 11A to 11D in which a milling tool is shown, generally designated 301, comprising a tool holder and a plurality of cutting inserts 320 mounted thereon.

Each cutting insert 320 is formed with several cutting edges 322 (defined between rake and relief surfaces 324, 326 respectively) and provided with auxiliary teeth 330 each having an auxiliary cutting edge 332.

Figure 11A:
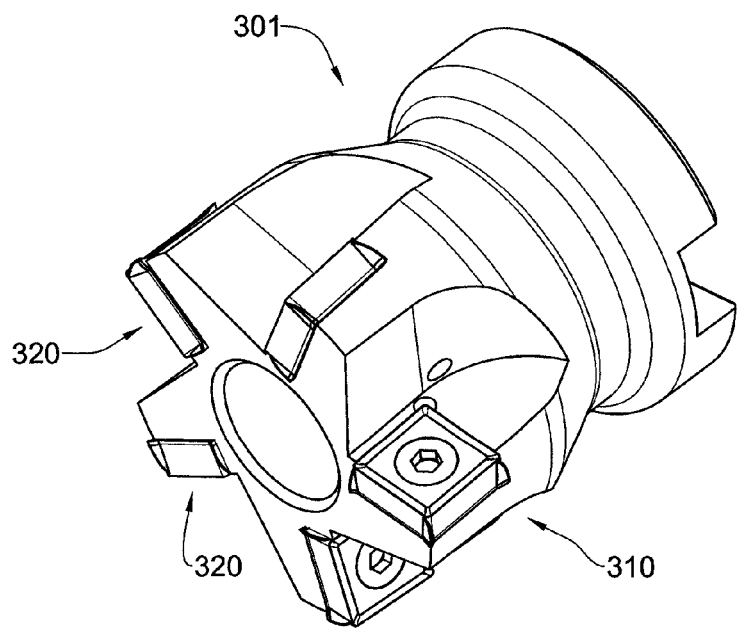
FIG. 11A is a schematic isometric view of a milling tool according to the subject matter of the present application.
Figure 11B:
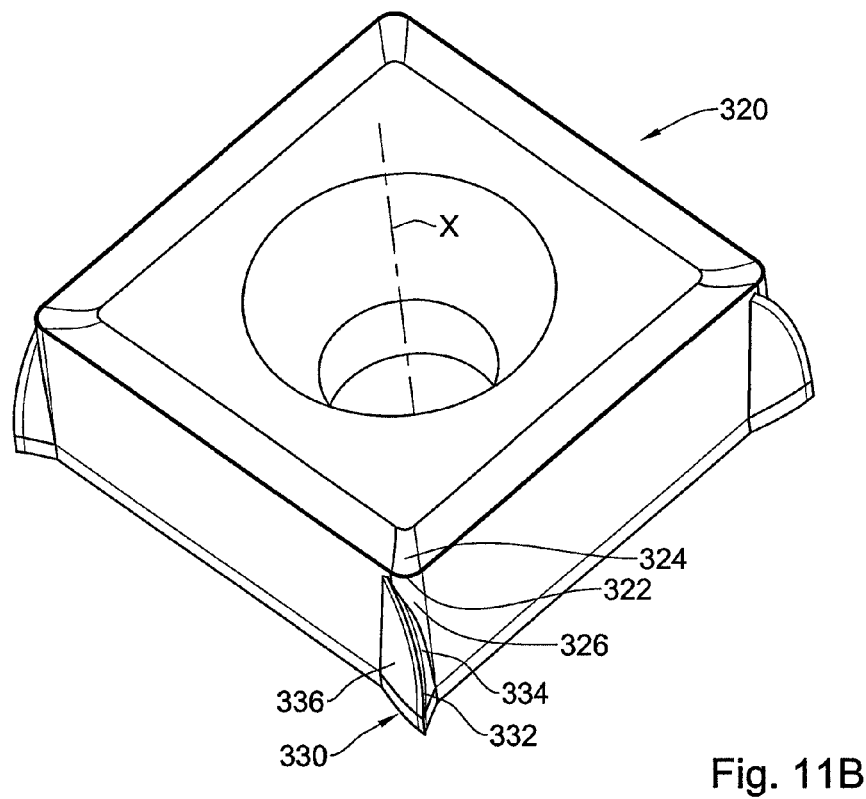
FIG. 11B is a schematic isometric view of a milling insert used in the milling tool shown in FIG. 11A.
Figure 11C:
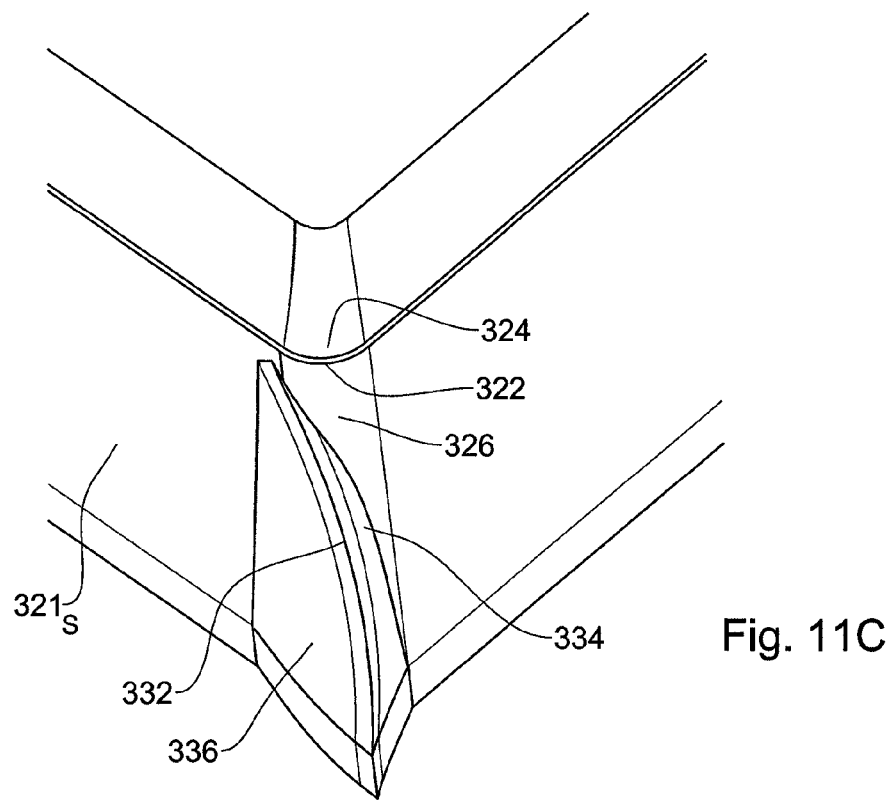
FIG. 11C is a schematic enlarged view of a portion of the milling insert shown in FIG. 11B.
Figure 11D:
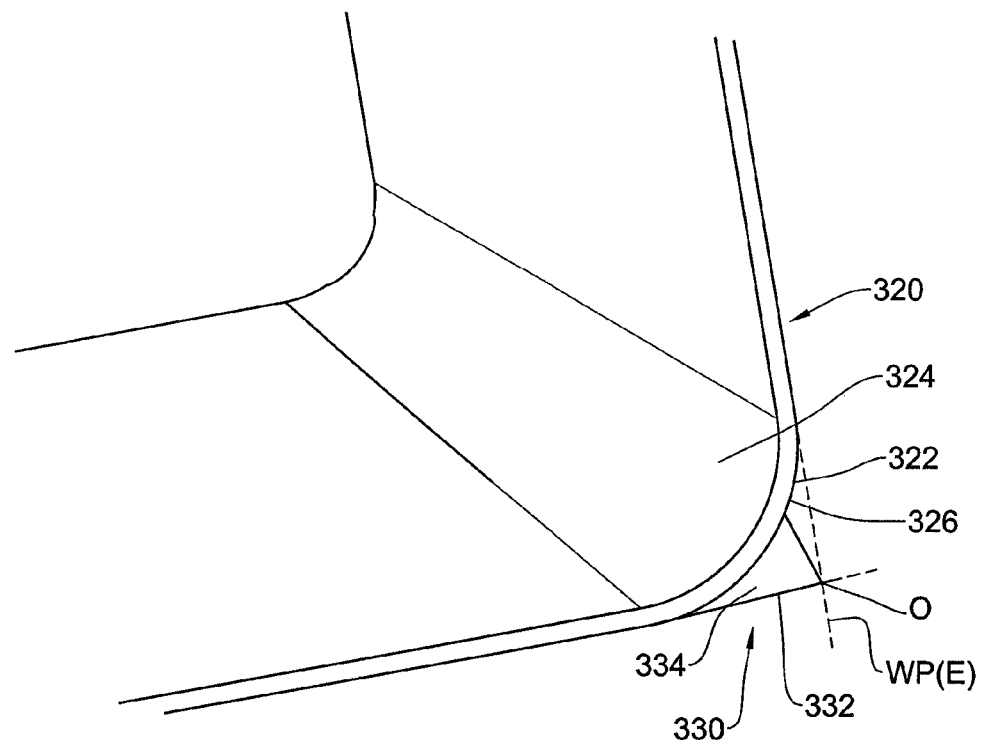
FIG. 11D is a schematic top view of the turning insert shown in FIG. 11A, positioned at an operative orientation.

As observed from FIG. 11D, the auxiliary cutting edge 332 does not intersect the bisector of the angle of the frame.

Figure 12A:
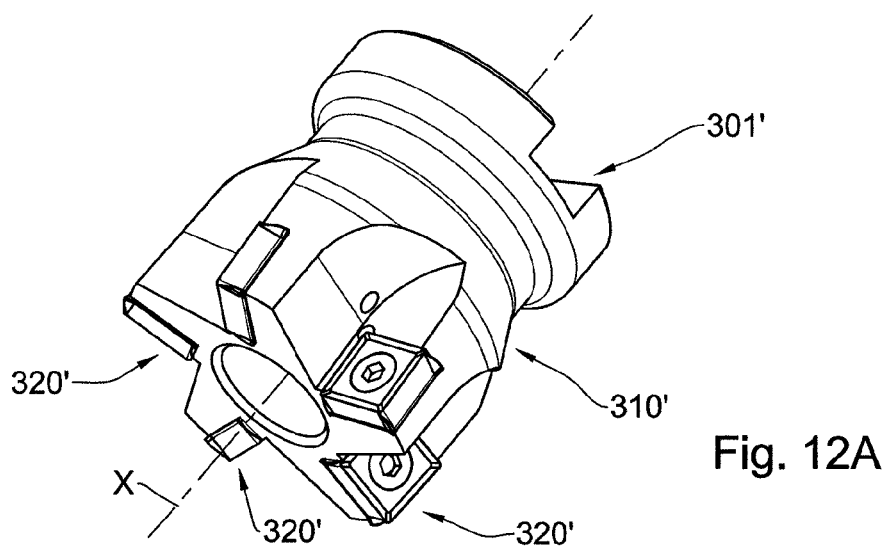
FIG. 12A is a schematic isometric view of another example of a milling tool according to the subject matter of the present application.
Figure 12B:
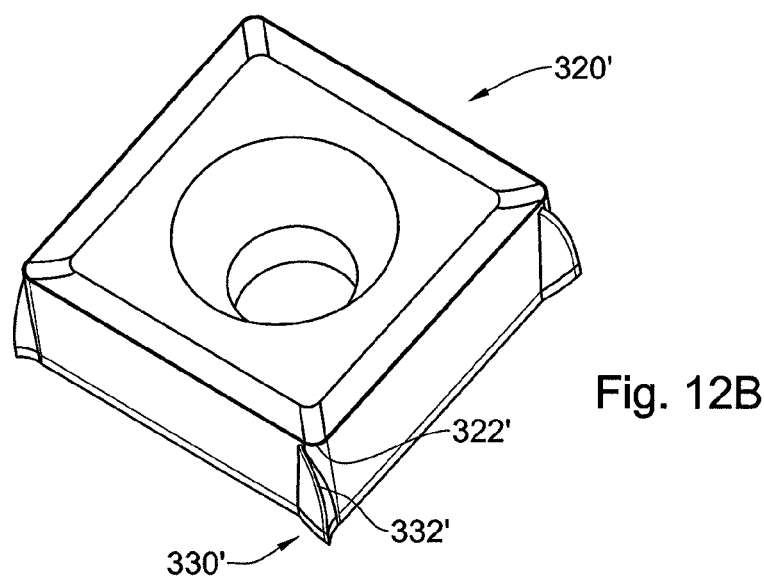
FIG. 12B is a schematic isometric view of a milling insert used in the milling tool shown in FIG. 12A.
Figure 12C:
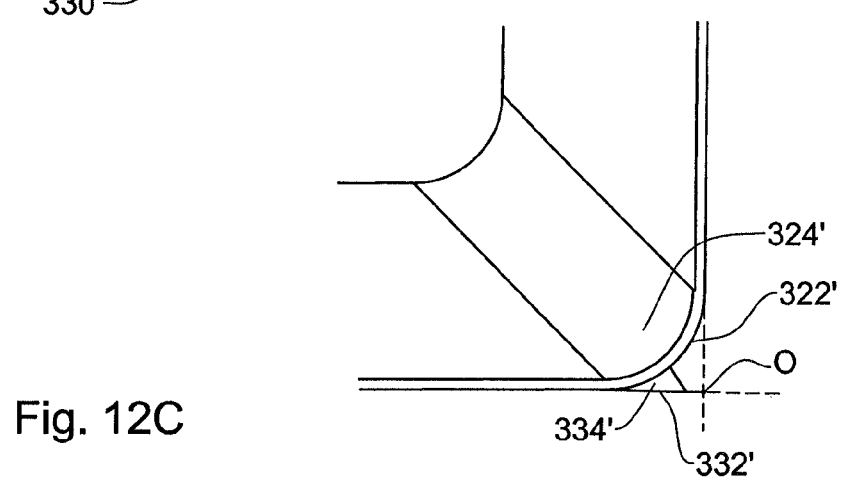
FIG. 12C is a schematic top view of the turning insert shown in FIG. 12A, positioned at an operative orientation.

Turning now to FIGS. 12A to 12C, still another example of a milling tool is shown generally designated as 301' and comprising a holder 310' and a plurality of cutting inserts 320'.

Each of the cutting inserts is provided with auxiliary cutting teeth 330', the operation and design of which is similar to that previously described. In this case, as in all other cases, it is observed that the auxiliary cutting edge 332' does not intersect the bisector and extends only partially along the tangent direction towards the corner O. It is also observed that the extension thereof is somewhat smaller than that of cutting edge 332 described in the previous example.

Figure 13B:
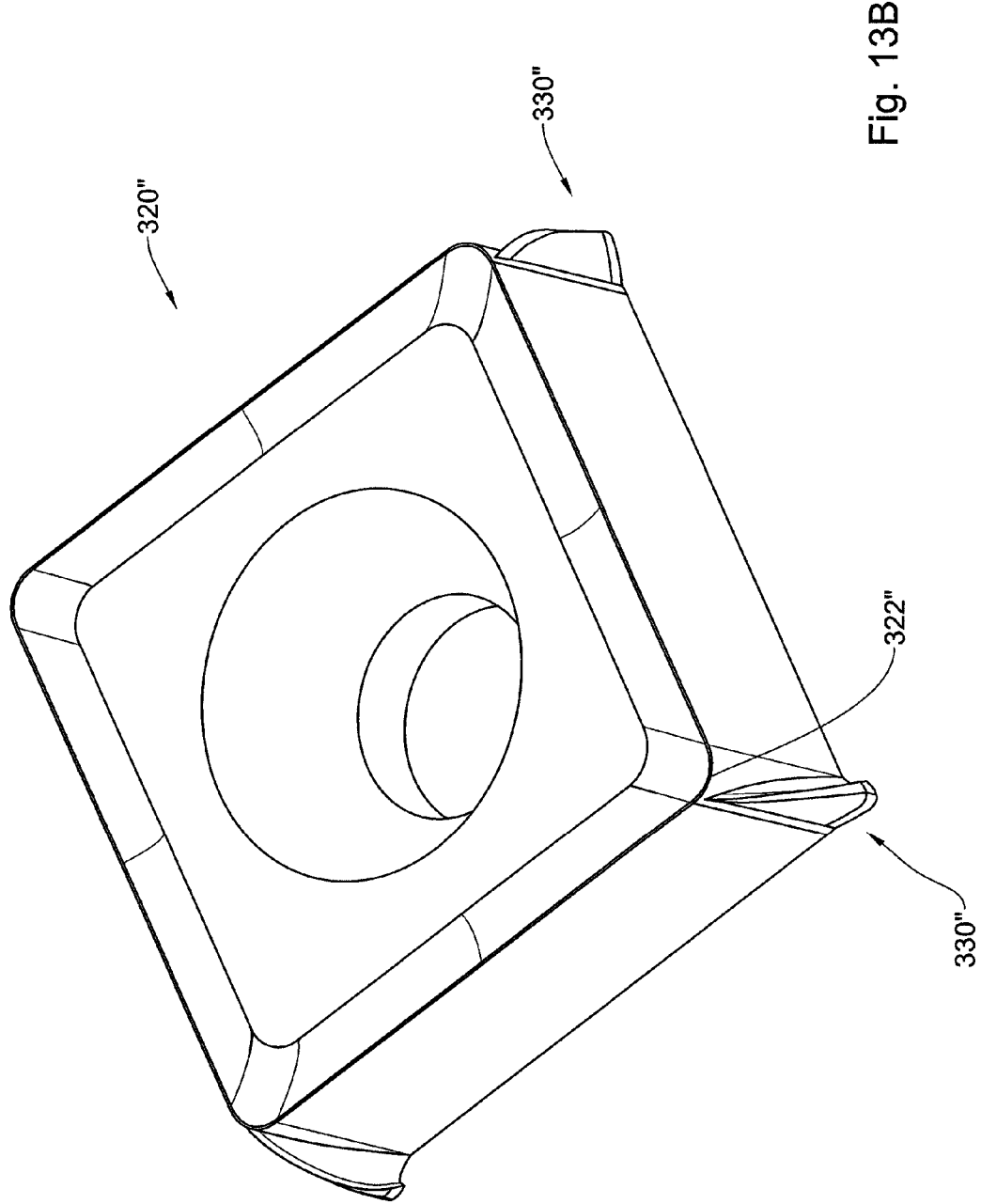
FIG. 13B is a schematic isometric view of a milling insert used in the milling tool shown in FIG. 13A.
Figure 13C:
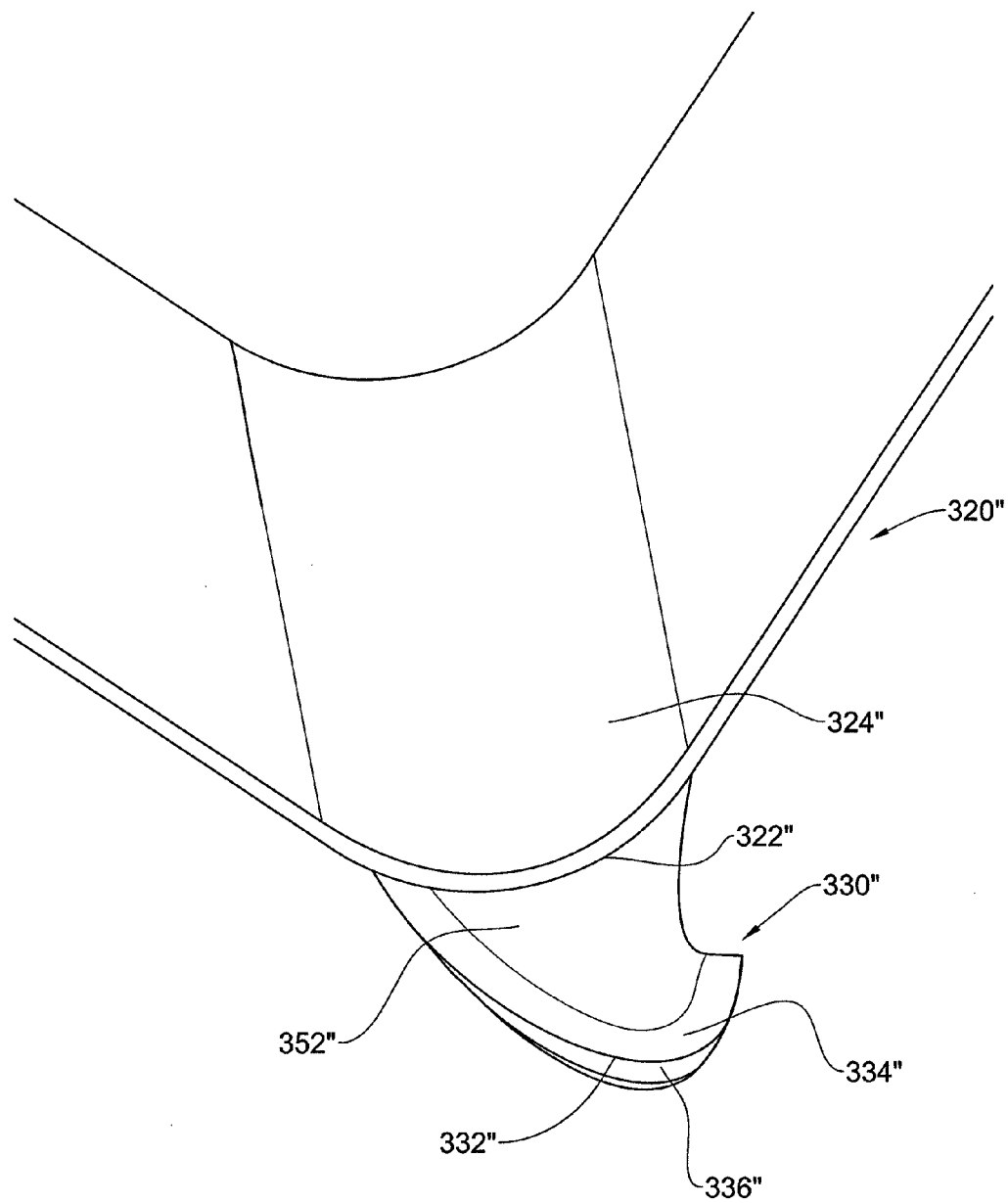
FIG. 13C is a schematic top view of the turning insert shown in FIG. 13A.

Turning now to FIGS. 13A to 13C, still another example of a milling tool is shown, generally designated as 301", and comprising a holder 310" and a plurality of inserts 320".

In this example, the auxiliary cutting tooth 330" takes on a rounded shape (in a projection showing the entire length of the cutting edge 322" in a working position) as previously described with respect to FIGS. 10A and 10B.

In particular, the auxiliary cutting edge 332" is of a spiral form extending from a top point adjacent the top face of the cutting insert 320" and towards a lower point adjacent the bottom surface of the cutting insert 320".

Such a configuration may allow reducing friction due to rotation as well as carving a deeper groove into the workpiece.

Figure 14A:
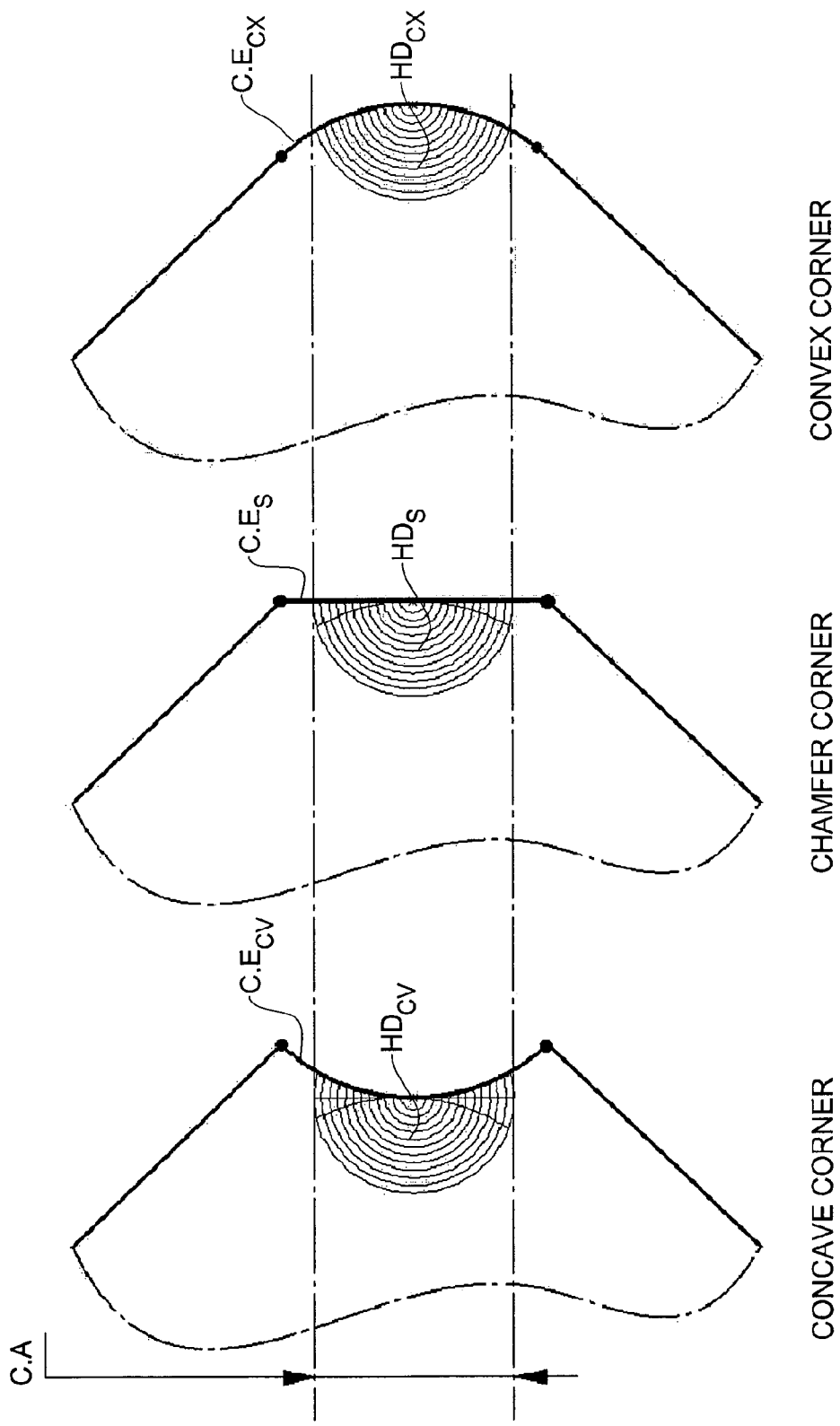
FIG. 14A is a schematic representation of three different types of cutting corners.
Figure 14B:
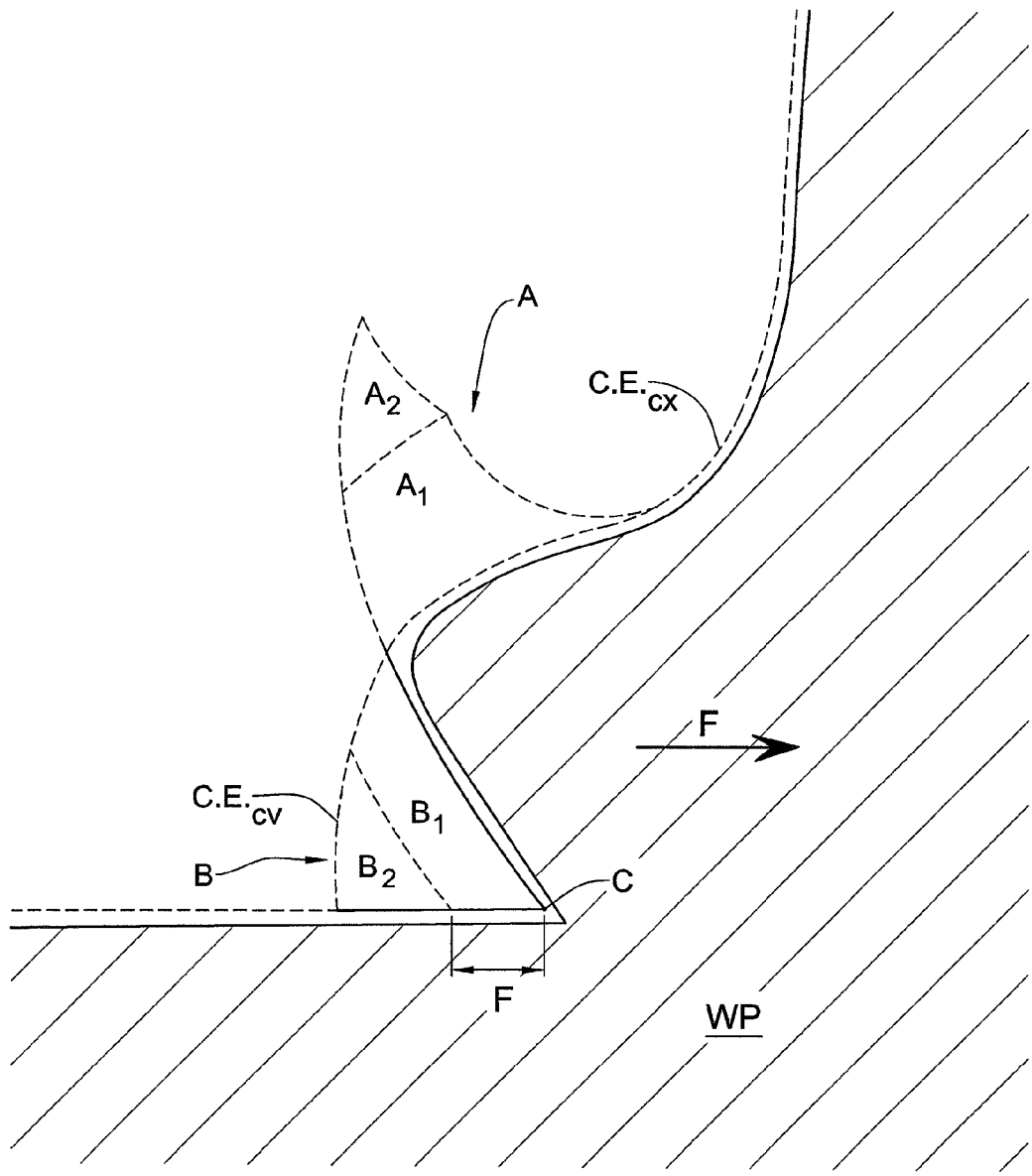
FIG. 14B is a schematic illustration of a cutting corner according to the subject matter of the present application during a cutting operation.

Attentions is now drawn to FIGS. 14A and 14B, in which the significance of the shape of the main cutting edge is shown. In particular, it is observed that a convex cutting edge $CE_{CX}$ has a radial heat dissipation zone $HD_{CX}$ of a first size, a straight cutting edge $CE_S$ has a radial heat dissipation zone $HD_S$ of a second size greater than the first size and a concave cutting edge $CE_{CV}$ has a radial heat dissipation zone $HD_{CV}$ of a third size greater than both the first and the second size. Thus, it may be beneficial to use a concave cutting edge for cutting operations.

With particular reference to FIG. 14B, when using a combined cutting edge (both concave and convex), the effects may be enhanced. In particular, when the concave portion is facilitated by the auxiliary cutting edge, the wear effects on that segment of the cutting edge are considerably reduced. At the convex portion, these effects are not as great in the first place.

In particular, the profile P left in the workpiece following the operation of the cutting edge CE has a concave portion and a convex portion. The auxiliary cutting edge penetrates into the convex portion of the profile (corresponding to the concave portion of the cutting edge) with greater ease, and separates, at first, an area designated B1+B2.

Thereafter, in each subsequent turn of the tool, since the tip has already be removed, only an area B1 is separated (with a corresponding area A1 being shown in a lifted position).

Figure 15A:
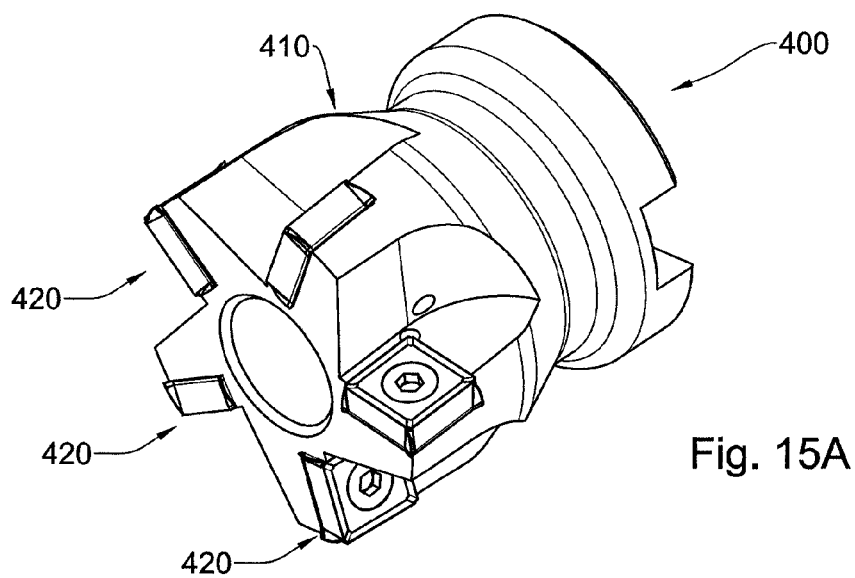
FIG. 15A is a schematic isometric view of another example of a milling tool according to the subject matter of the present application.
Figure 15B:
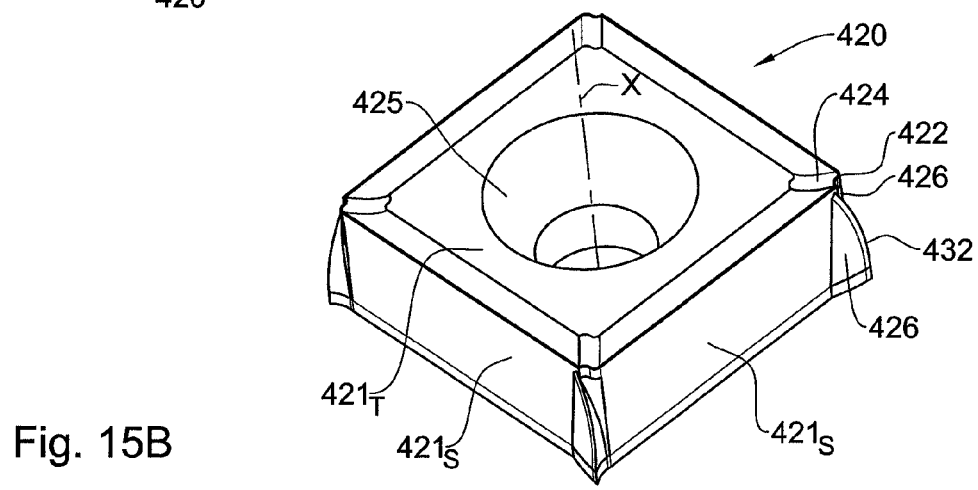
FIG. 15B is a schematic isometric view of a milling insert used in the milling tool shown in FIG. 15A.
Figure 15C:
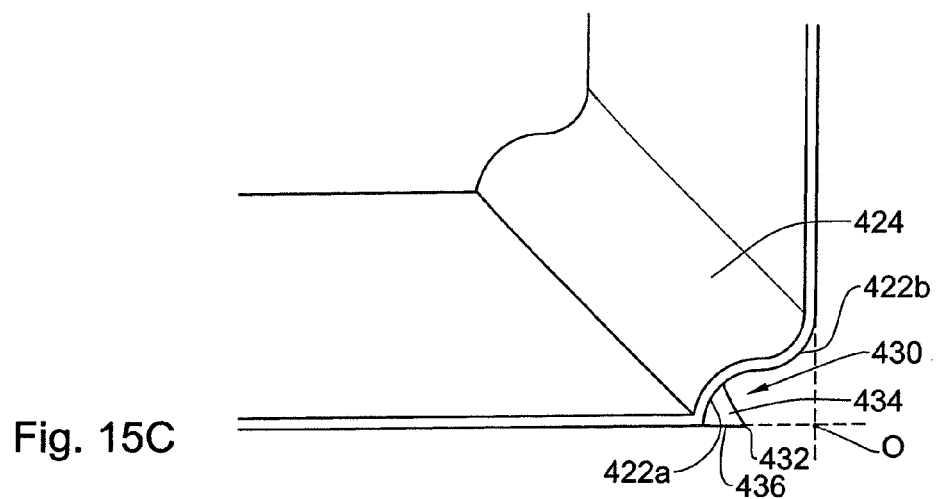
FIG. 15C is a schematic top view of the turning insert shown in FIG. 15A.

Attentions is now drawn to FIGS. 15A to 15C, in which a milling tool is shown generally designated as 400 and comprising a holder 410 and a plurality of milling inserts 420, each provided with an auxiliary tooth 430.

The milling tool 400 is generally similar to the milling tool 301' shown in FIGS. 12A to 12C, with the difference lying in the design of the main cutting edge 422, which is similar in shape to that shown in FIG. 14B.

As in all previously shown examples, the auxiliary cutting tooth 430 is designed such that the cutting edge 432 thereof does not intersect the bisector B of the angle α.

Figure 16A:
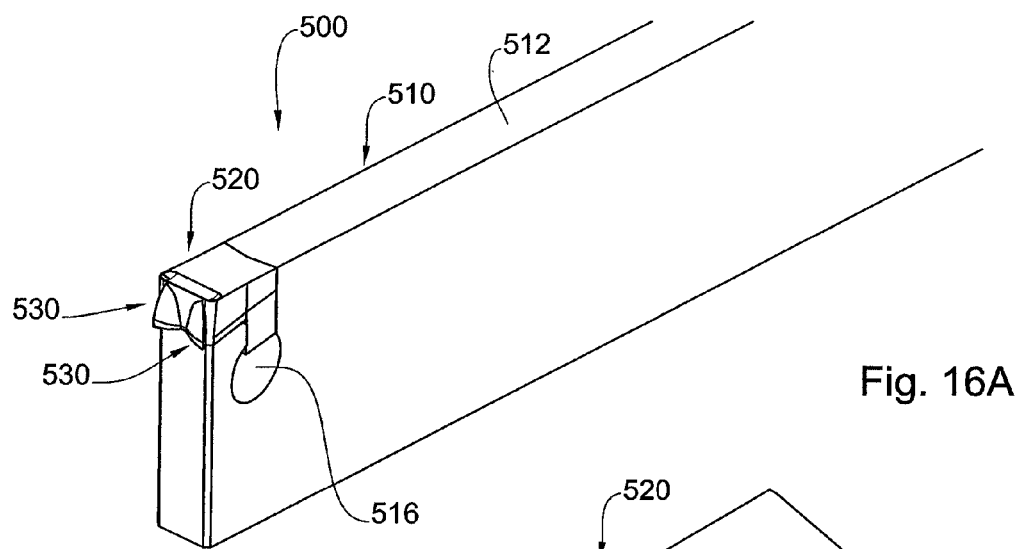
FIG. 16A is a schematic isometric view of a severing tool according to the subject matter of the present application.
Figure 16B:
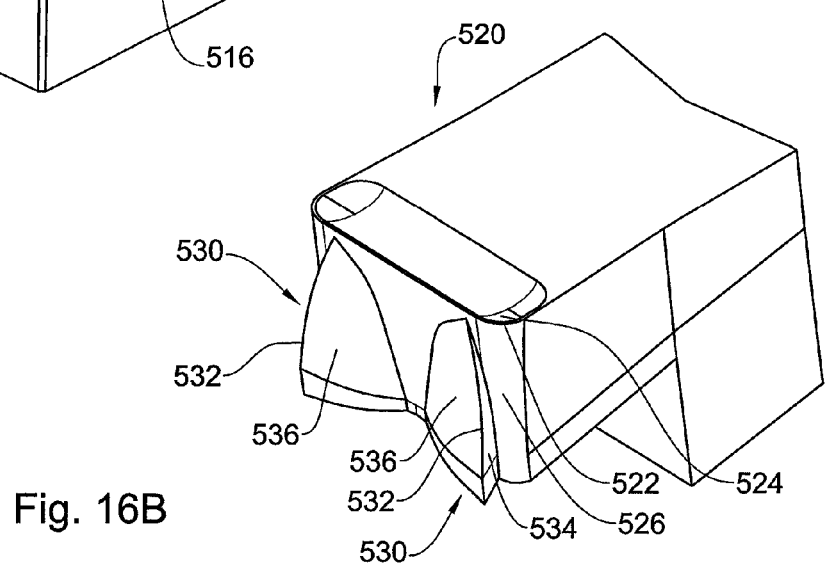
FIG. 16B is a schematic isometric view of a severing insert used in the milling tool shown in FIG. 16A.
Figure 16C:
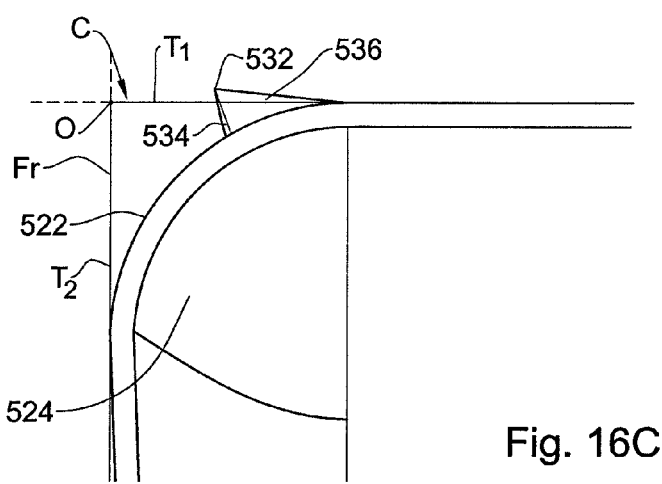
FIG. 16C is a schematic top view of the severing insert shown in FIG. 15A, positioned at an operative orientation.

Turning now to FIGS. 16A to 16C, a parting tool is shown generally designated 500 and comprising a holder 510 and a parting insert 520 formed with two auxiliary cutting elements 530.

The parting insert 520 has two cutting corners, each formed with its own cutting edge 522, and each of the auxiliary cutting elements 530 comprises a cutting edge 532. It is observed (FIG. 16C) that the cutting edge 532 extends beyond the envelope of the cutting edge 522 (as is the case in previous cases) and also beyond the frame Fr defined by the tangents $T_1$, $T_2$, similarly to the example AT" shown in FIG. 2H.

Figure 17A:
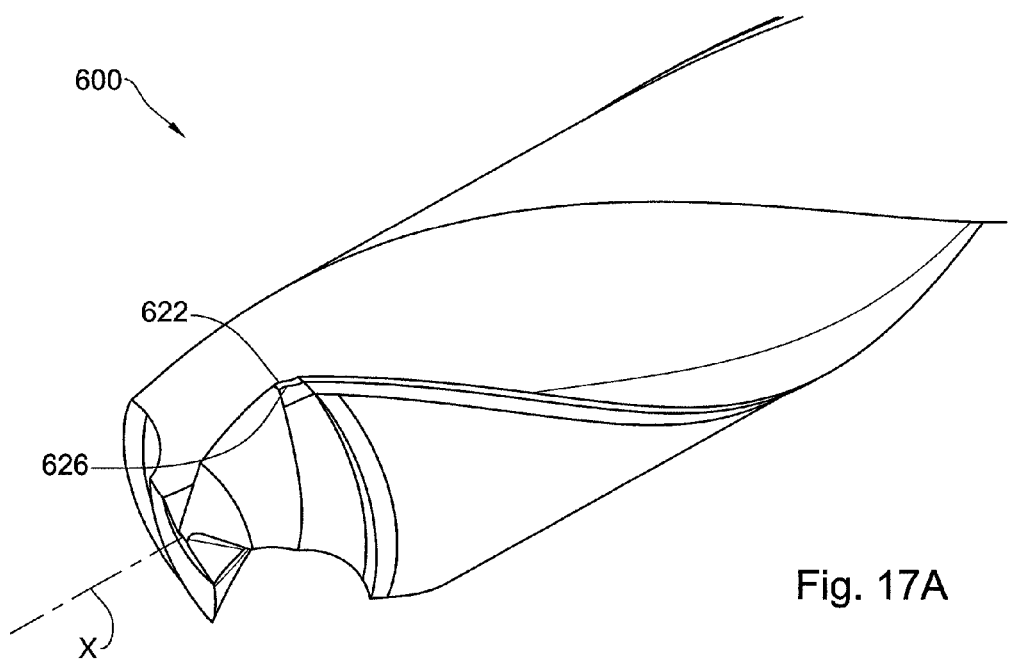
FIG. 17A is a schematic isometric view of another example of a drilling tool according to the subject matter of the present application.
Figure 17B:
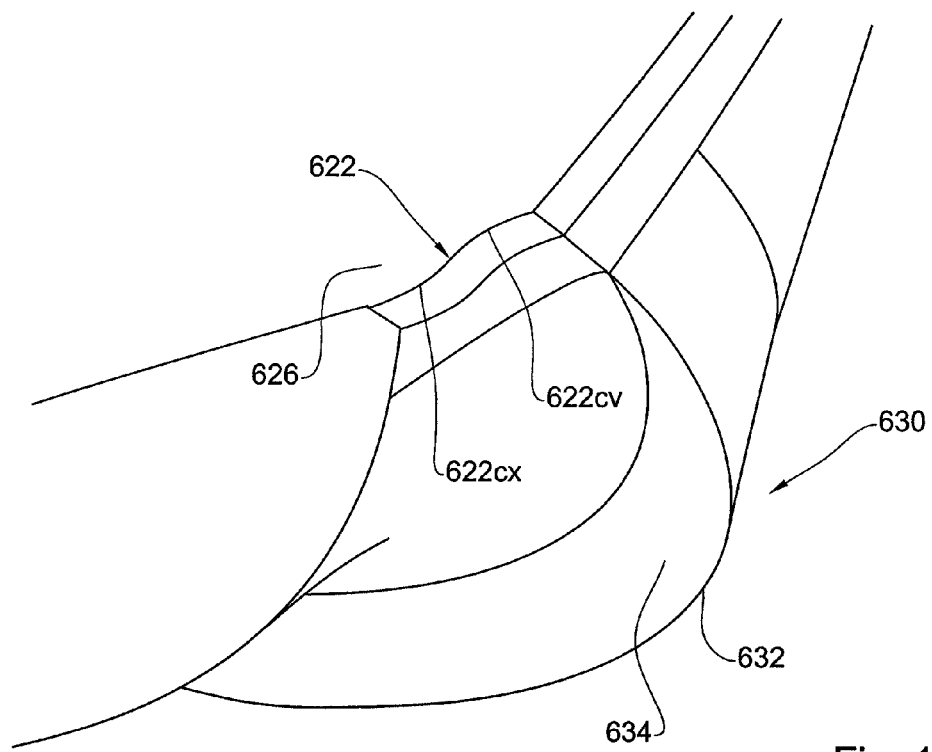
FIG. 17B is a schematic enlarged view of a portion of the drilling tool shown in FIG. 17A.

Attention is further drawn to FIGS. 17A and 17B in which a drilling tool is shown generally designated as 600 and comprising a shank portion 610 and a cutting portion 620. The drilling tool 600 is similar to that described in FIGS. 7A to 7C, with the difference lying in the design of the main cutting edge 622 thereof which is also of a combined concave/convex configuration. Thus, the cutting edge 622 has a concave portion $622_{CV}$ and a convex portion $622_{CX}$. In all other aspects, operation is similar.

Figure 18A:
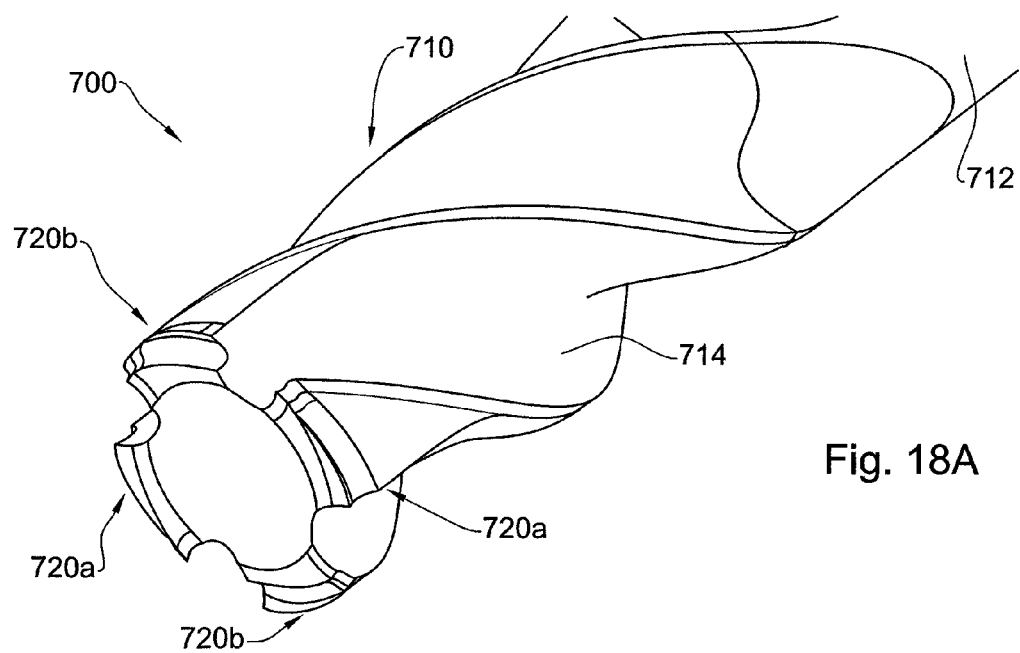
FIG. 18A is a schematic isometric view of another example of a milling tool according to the subject matter of the present application.
Figure 18B:
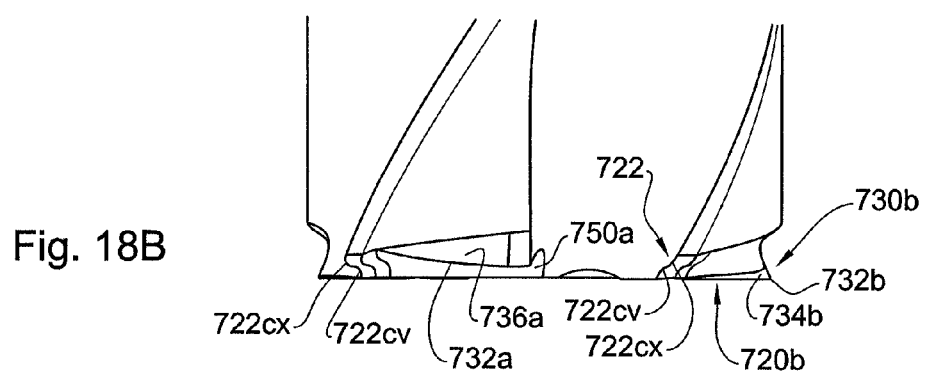
FIGS. 18B and 18C are schematic enlarged front views of a portion of the milling tool shown in FIG. 18A, during consecutive stages of a cutting operation.
Figure 18C:
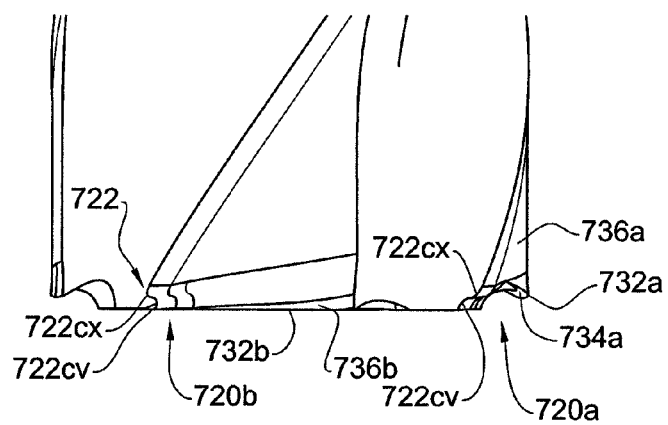

Turning to FIGS. 18A to 18C, a milling tool is shown generally designated 700, and comprising a shank portion 710 and a cutting portion 720, each portion comprising an auxiliary cutting tooth 730.

The milling tool is similar to previously described milling tool 1''' shown in FIGS. 6A to 6D, with the difference lying in the design of the main cutting edge 722, having a combined concave/convex shape.

With attention being now drawn to FIGS. 19A to 19E, a turning tool is shown generally designated 800 and comprising a holder 810 and a turning insert 820 having eight cutting edges 822, each being provided with two auxiliary cutting edges 832. This design is similar, in essence to that previously described with respect to insert 220' of FIG. 9, with the difference lying in the design of the main cutting edge 822. In particular, the main cutting edge 822 is concave rather than convex (as shown in FIG. 9).

Figure 19A:
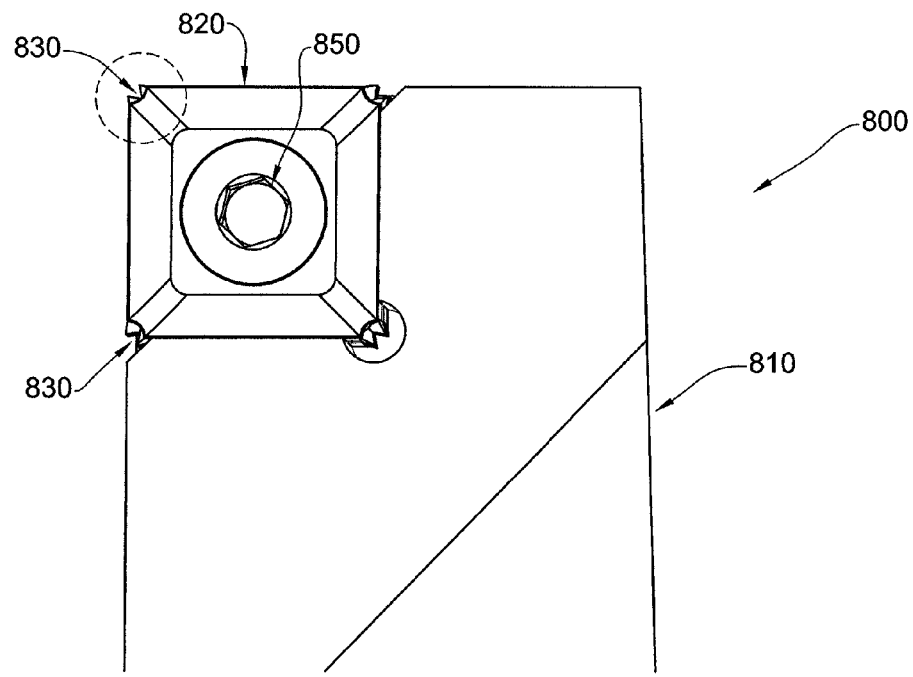
FIG. 19A is a schematic top view of another example of a turning tool according to the subject matter of the present application.
Figure 19B:
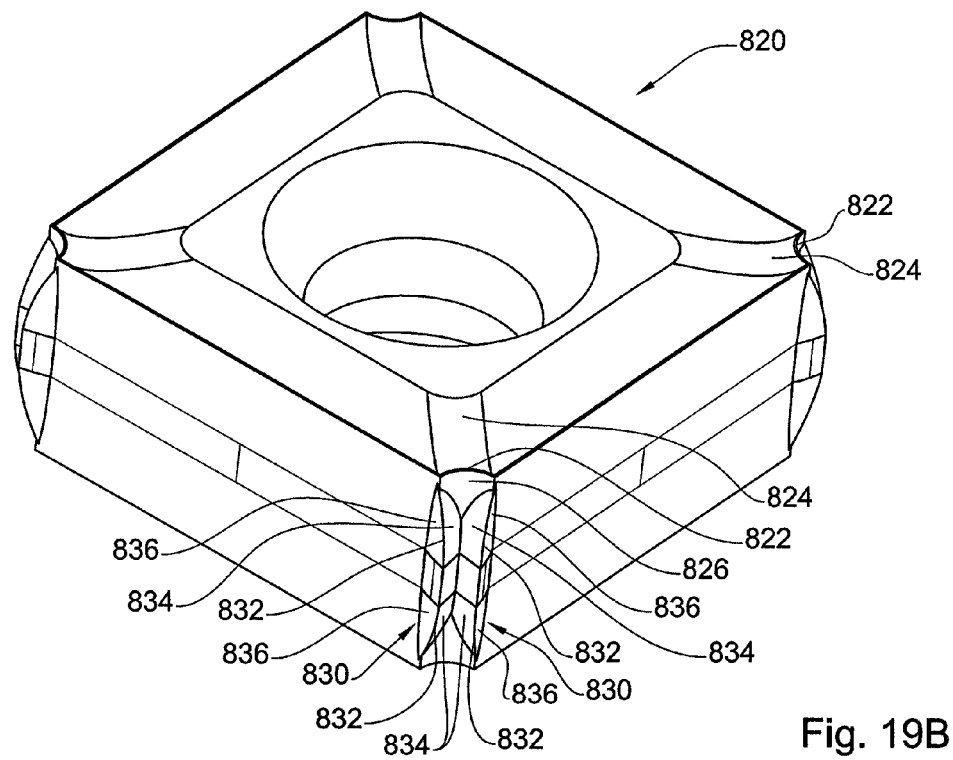
FIG. 19B is a schematic isometric view of a turning insert used in the turning tool shown in FIG. 19A.
Figure 19C:
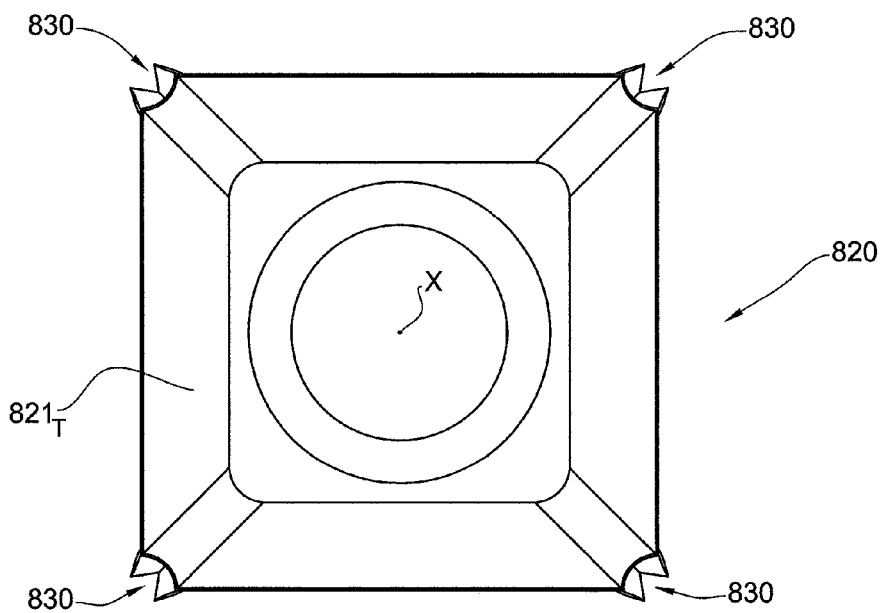
FIG. 19C is a schematic top view of the turning insert shown in FIG. 19B.
Figure 19D:
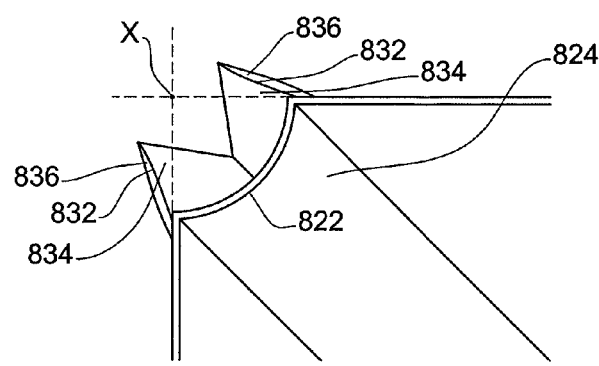
FIG. 19D is a schematic enlarged view of a portion of the cutting insert shown in FIG. 19C.
Figure 19E:
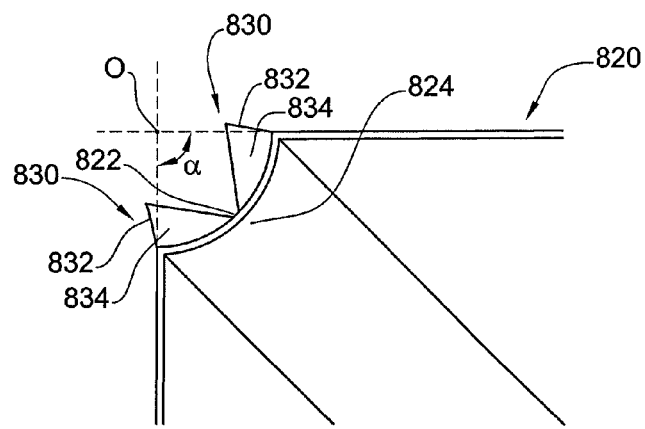
FIG. 19E is a schematic enlarged view of a portion of the cutting insert shown in FIG. 19C, shown when the turning insert is positioned at an operative orientation.

Particular attention is drawn to FIGS. 19D and 19E, showing a top view of the cutting insert 820 and a working view of the cutting insert 820 respectively. It is observed from the working view that the cutting edges 832 do not intersect the bisector of the angle α and do not reach point O of the frame.

Figure 20A:
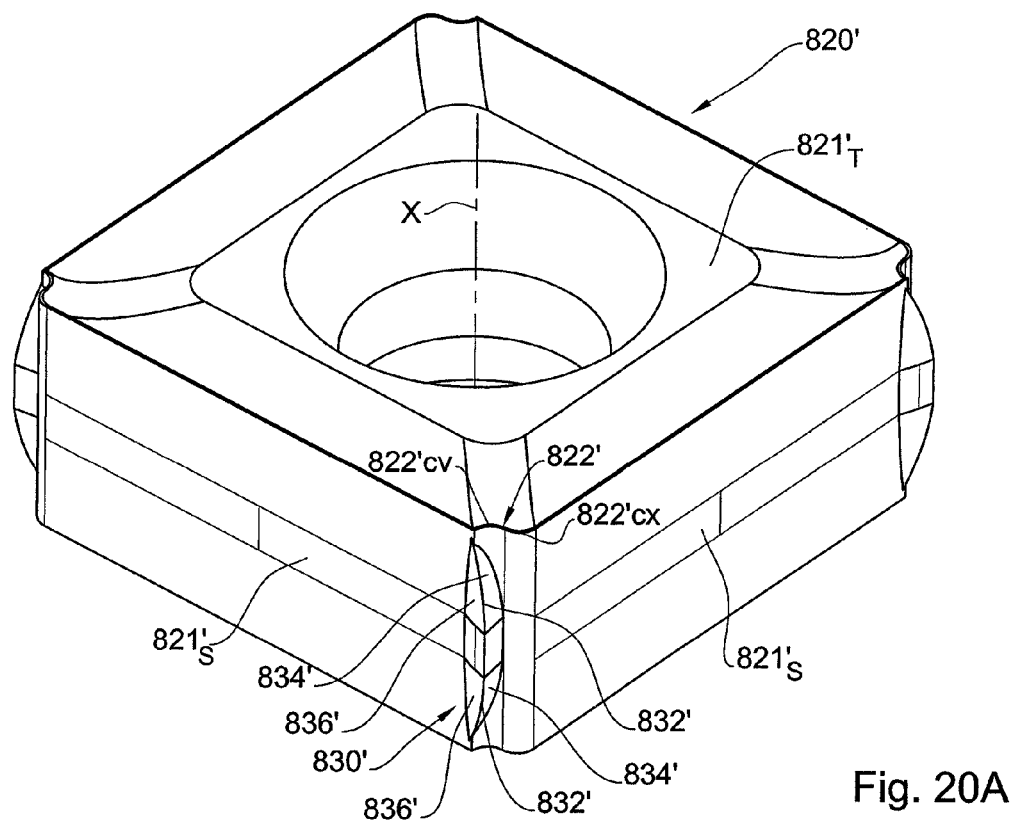
FIG. 20A is a schematic is a schematic isometric view of a turning insert according to another example of the subject matter of the present application.
Figure 20B:
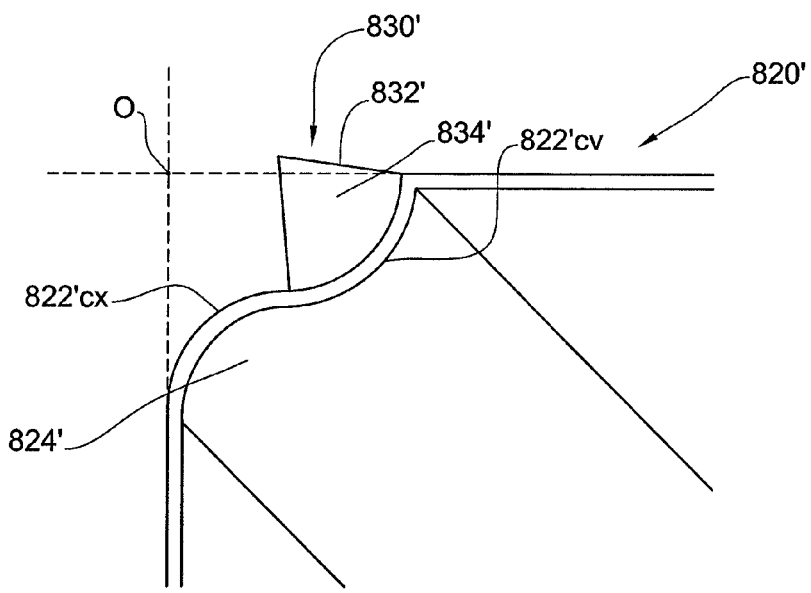
FIG. 20B is a schematic enlarged view of a portion of the cutting insert shown in FIG. 20A, shown when the turning insert is positioned at an operative orientation.

Turning to FIGS. 20A and 20B, another example is shown of a turning tool designated 800' and similar to turning tool 800 with the difference being in the design of the main cutting edge 822. In particular, instead of a concave cutting edge 822, the cutting edge 822' is a combination of concave/convex segments as previously described.

In all of the above examples, similar reference numerals are used to denote similar features of the tools, e.g. cutting edge 430 is similar to cutting edge 530, 630 and so forth.

Figure 21A:
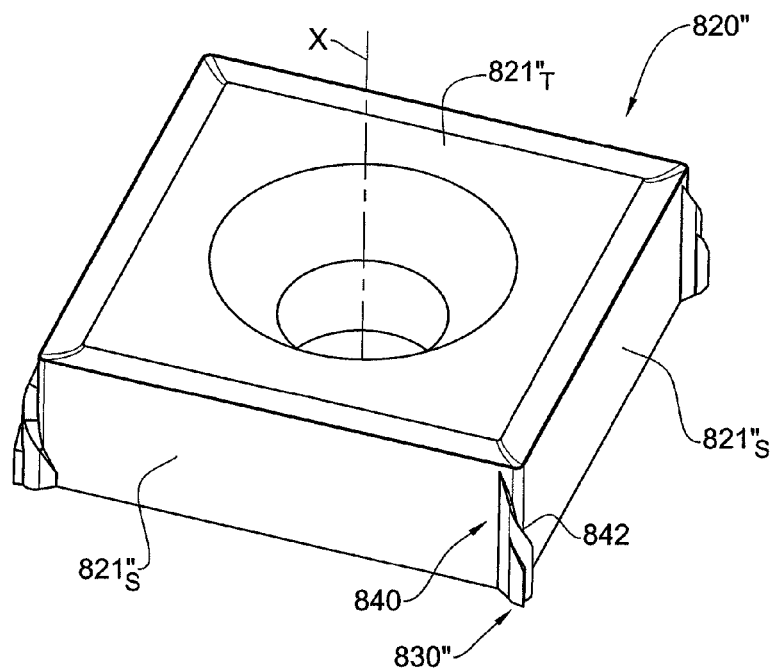
FIG. 21A is a schematic is a schematic isometric view of a turning insert according to another example of the subject matter of the present application.
Figure 21B:
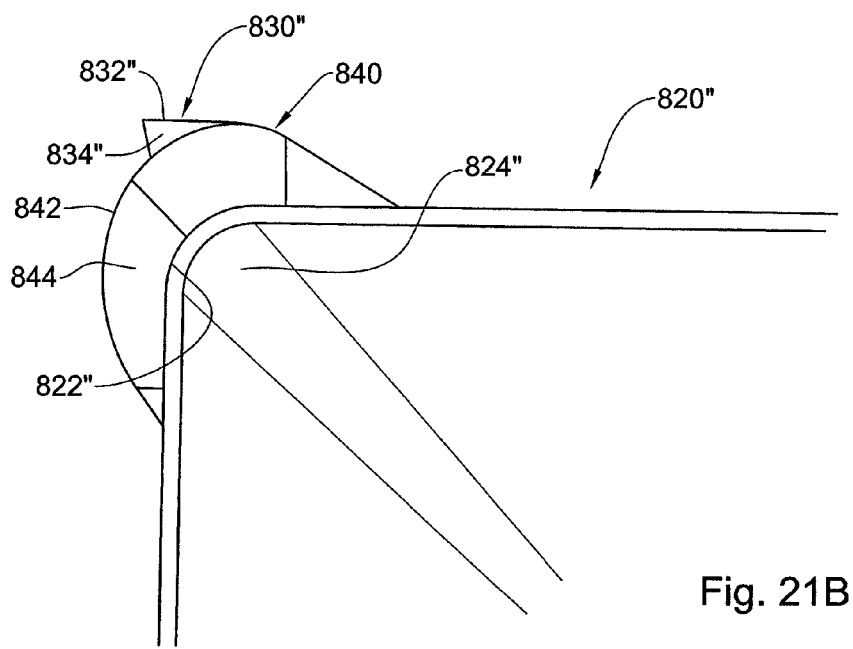
FIG. 21B is a schematic enlarged view of a portion of the cutting insert shown in FIG. 21A, shown when the turning insert is positioned at an operative orientation.
Figure 22A:
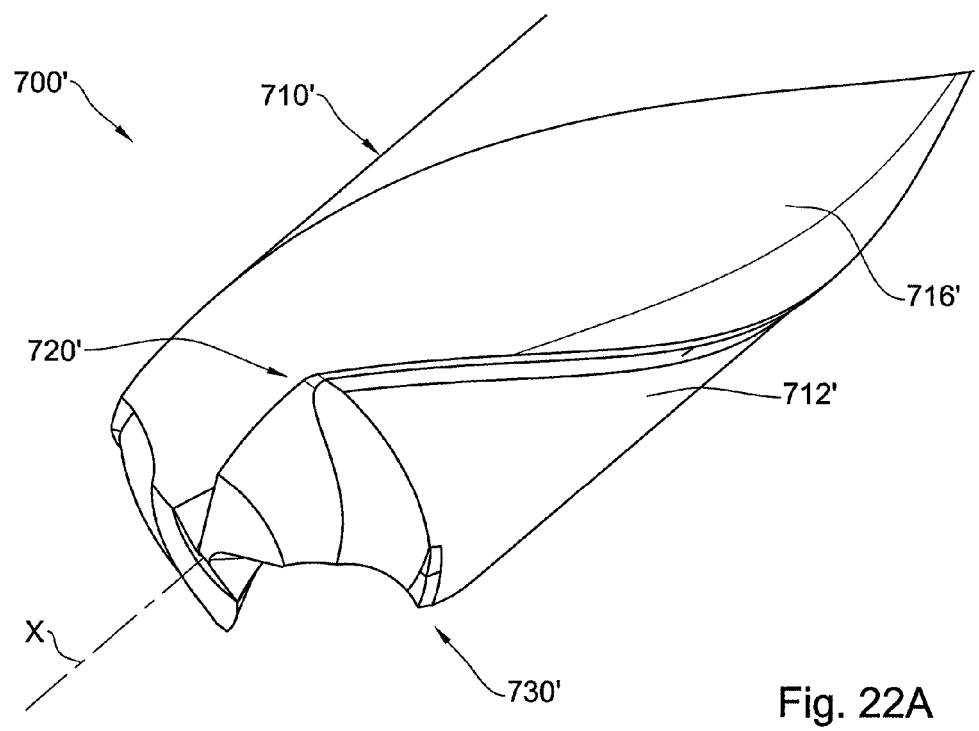
FIG. 22A is a schematic isometric view of another example of a drilling tool according to the subject matter of the present application.
Figure 22B:
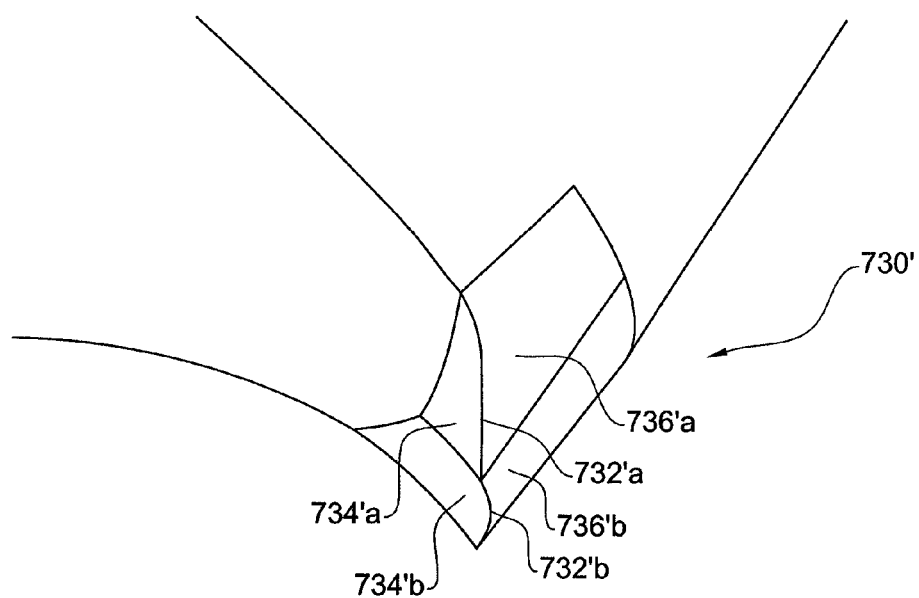
FIG. 22B is a schematic enlarged view of a portion of the drilling tool shown in FIG. 22A.
Figure 22C:
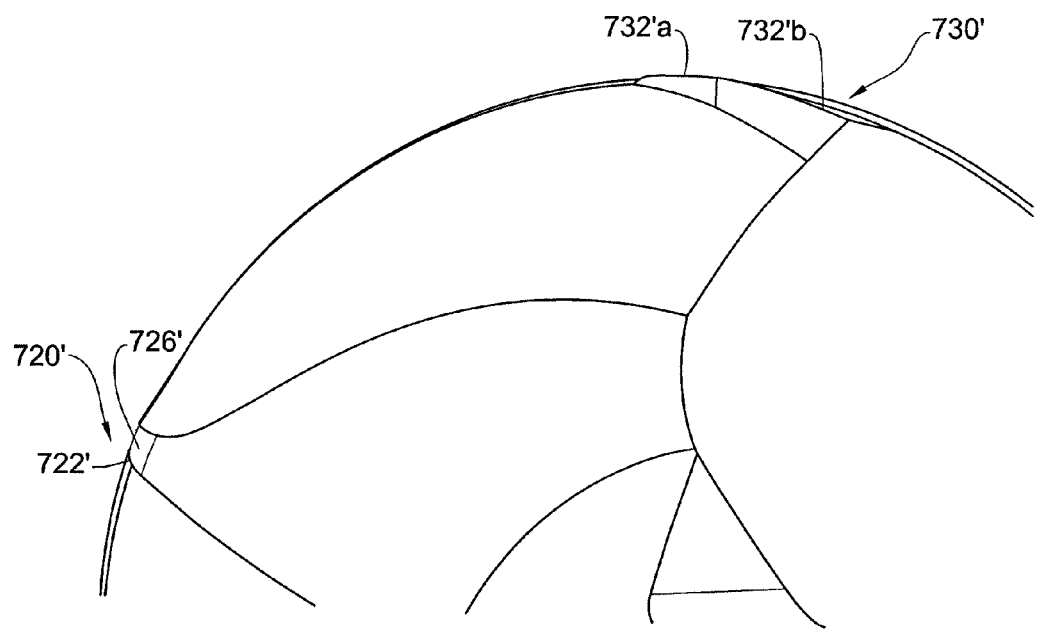
FIG. 22C is a schematic enlarged bottom view of a portion of the drilling tool shown in FIG. 22A.
Figure 22D:
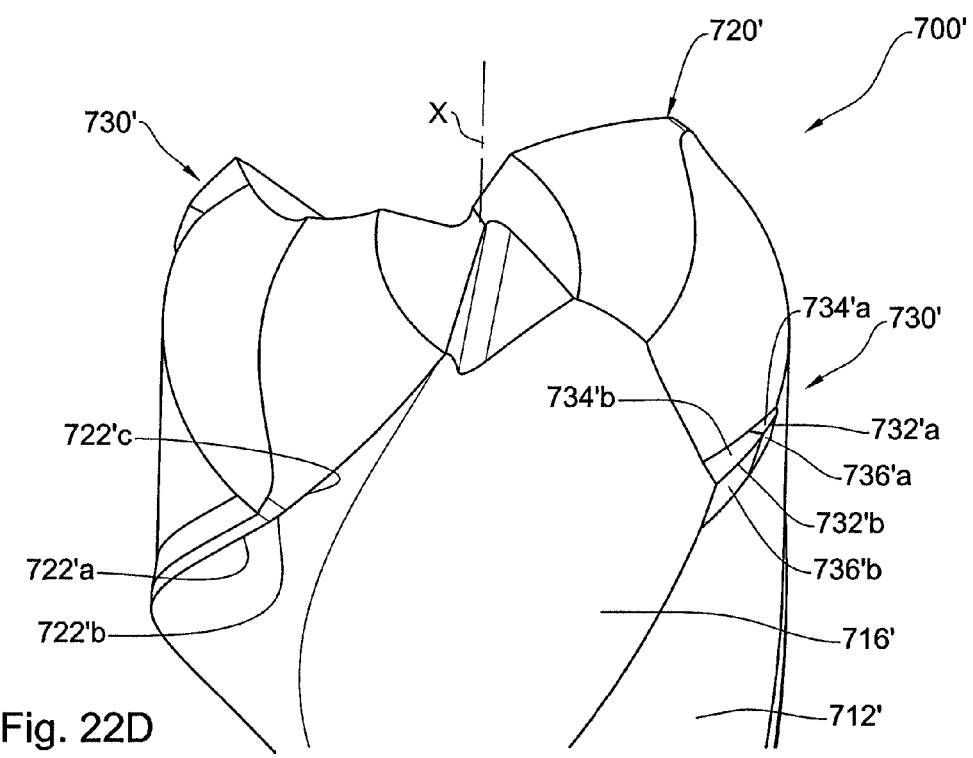
FIG. 22D is a schematic isometric bottom view of a portion of the drilling tool shown in FIG. 22A.

Turning now to FIGS. 21A and 21B, another example of a turning insert is shown generally designated as 820", in which an additional cutting element 840 is provided interposed between the sidewalls of the turning insert and the auxiliary tooth 830".

The additional cutting element 840 is configured for additional removal of material from the workpiece, in a manner previously described by the applicant in PCT/IL2013/050445 to the applicant, which is incorporated herein by reference.

Thus, the main cutting edge 822" performs the main removal of material from the workpiece, the cutting edge 842 of the additional cutting element 840 (also referred herein as a 'balcony cutter') removes further material and the auxiliary tooth 830" protects both the main and the additional cutting edges.

Turning now to FIGS. 22A to 22D, another example of a drilling tool is shown generally designated 700' comprising a shank 710' and two cutting portions 720', each having an auxiliary cutting tooth 730'.

The main difference between the drilling tool 700' and the previously described drilling tool 700 lies in the length of the auxiliary cutting edge 732'. In the present example, the length is shortened considerably so that the leading edge of the auxiliary cutting edge 732' is located remote from the main cutting edge 722', thereby reducing the overall length of the edge 732'.

This shortening of the cutting edge allows reducing the frictional forces applied thereto during the operation of the drilling tool 700'.

Figure 23A:
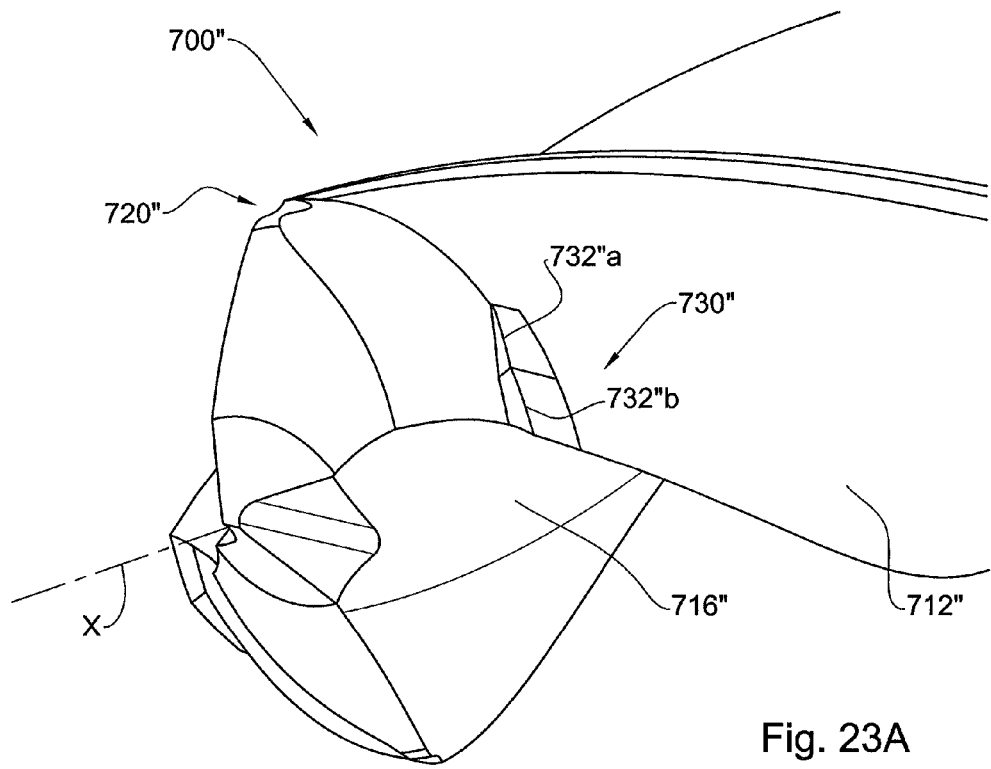
FIG. 23A is a schematic isometric view of another example of a drilling tool according to the subject matter of the present application.
Figure 23B:
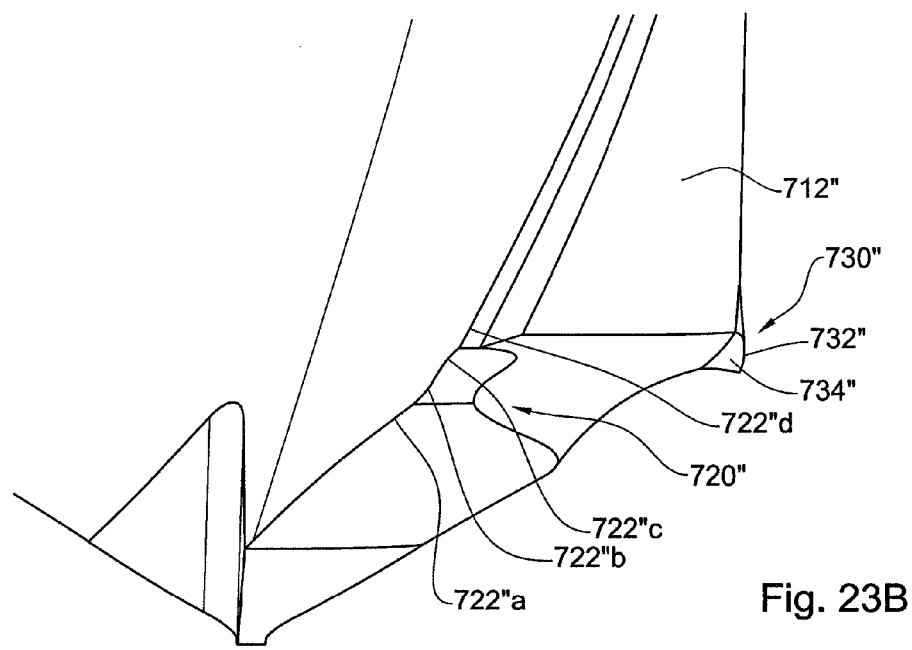
FIG. 23B is a schematic enlarged view of a portion of the drilling tool shown in FIG. 23A.
Figure 24A:
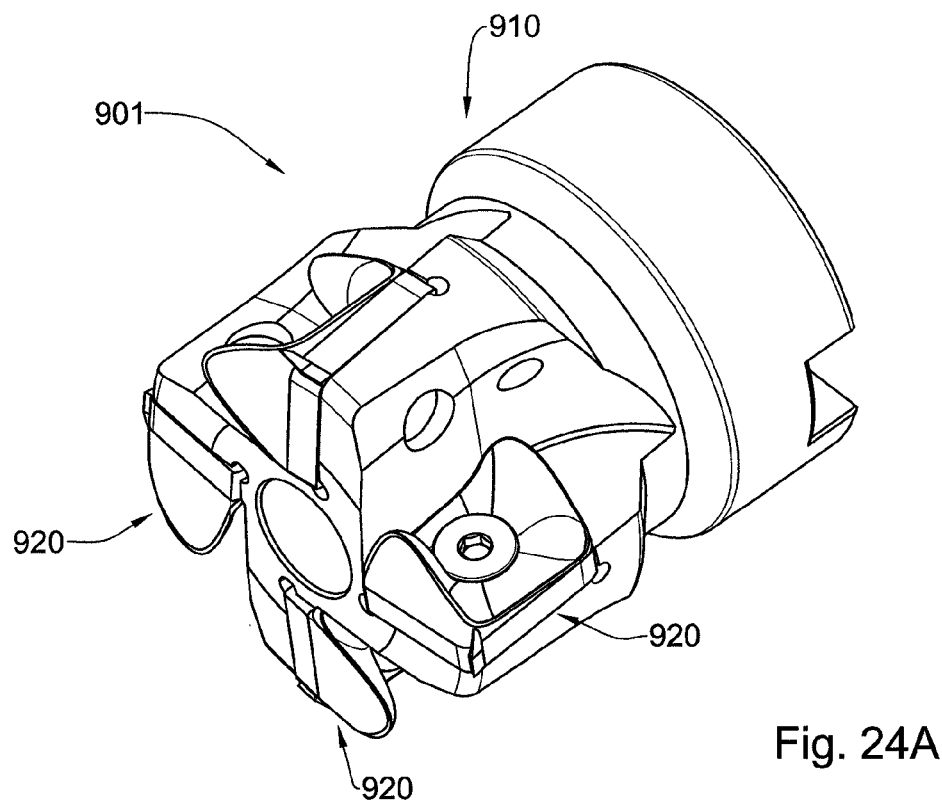
FIG. 24A is a schematic isometric view of another example of a milling tool according to the subject matter of the present application.
Figure 24B:
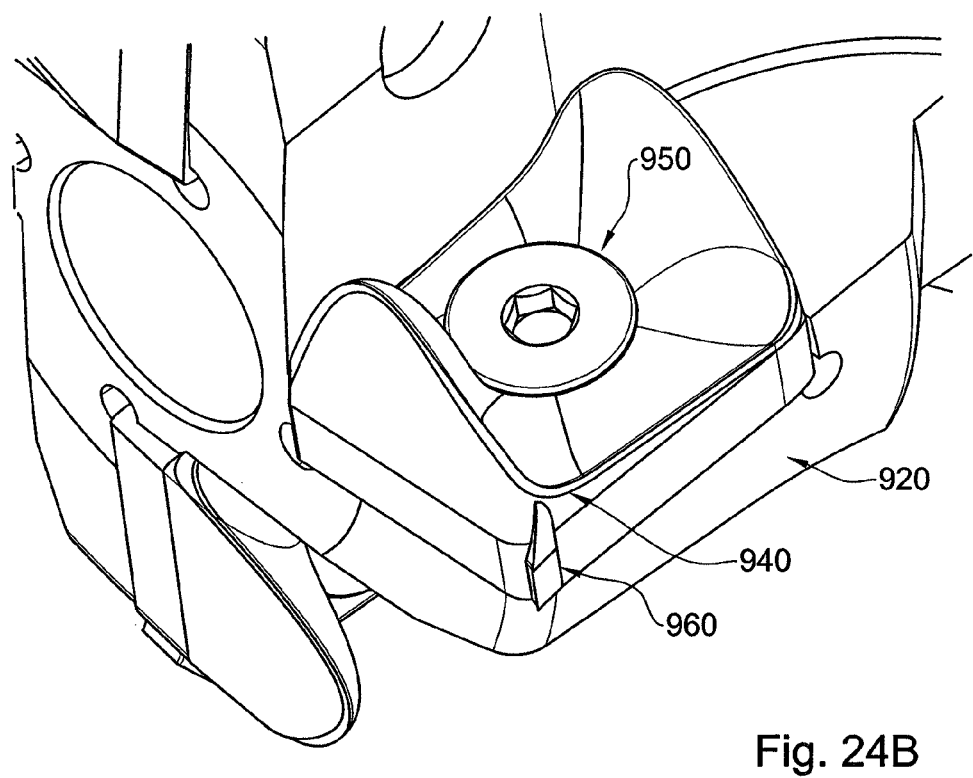
FIG. 24B is a schematic enlarged view of a milling insert used in the milling tool shown in FIG. 24A.
Figure 24C:
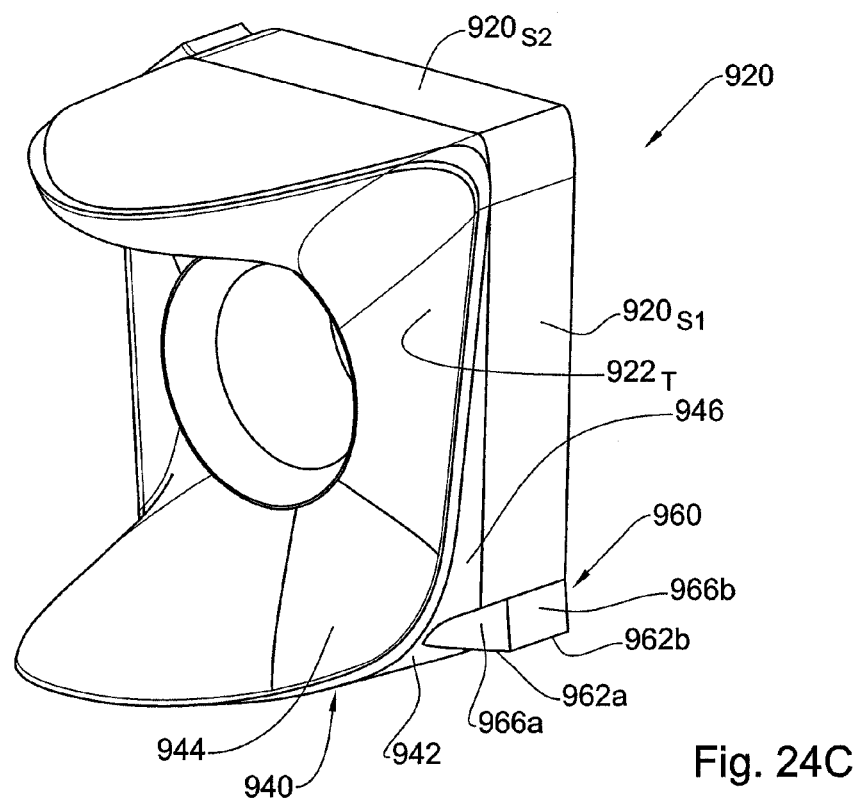
FIG. 24C is a schematic isometric view of a milling insert used in the milling tool shown in FIG. 24A.
Figure 24D:
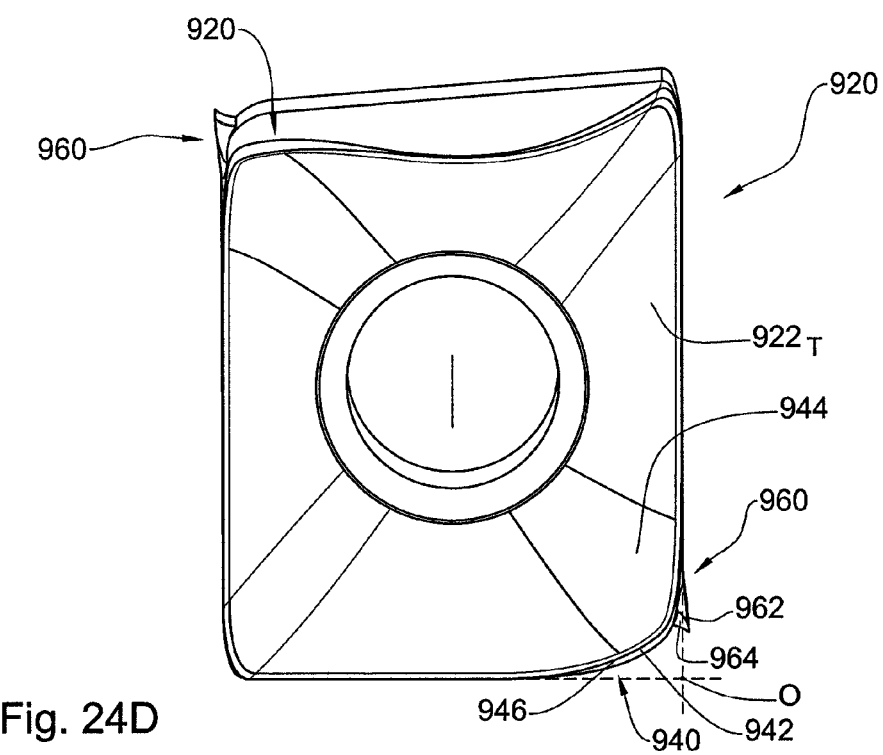
FIG. 24D is a schematic top view of a milling insert used in the milling tool shown in FIG. 24A, positioned at an operative orientation.
Figure 25A:
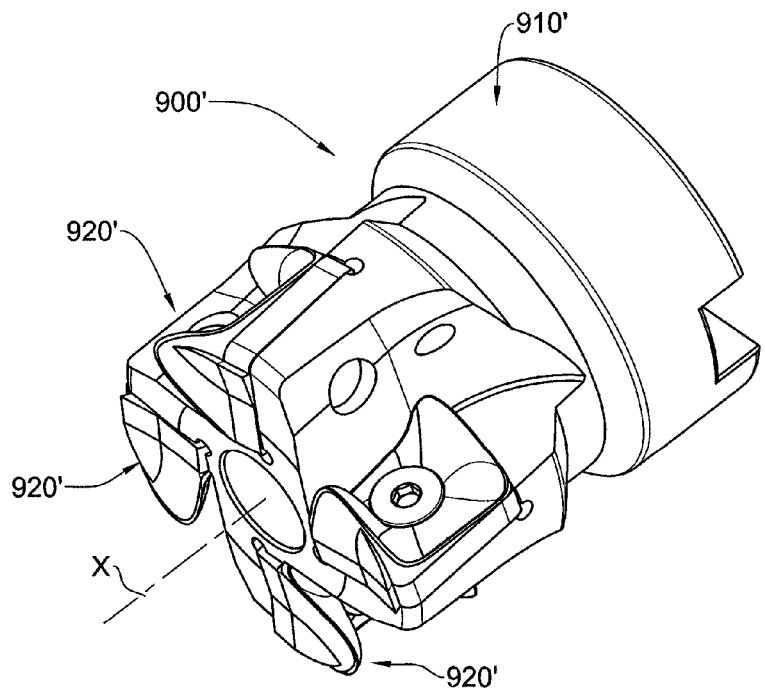
FIG. 25A is a schematic isometric view of another example of a milling tool according to the subject matter of the present application.
Figure 25B:
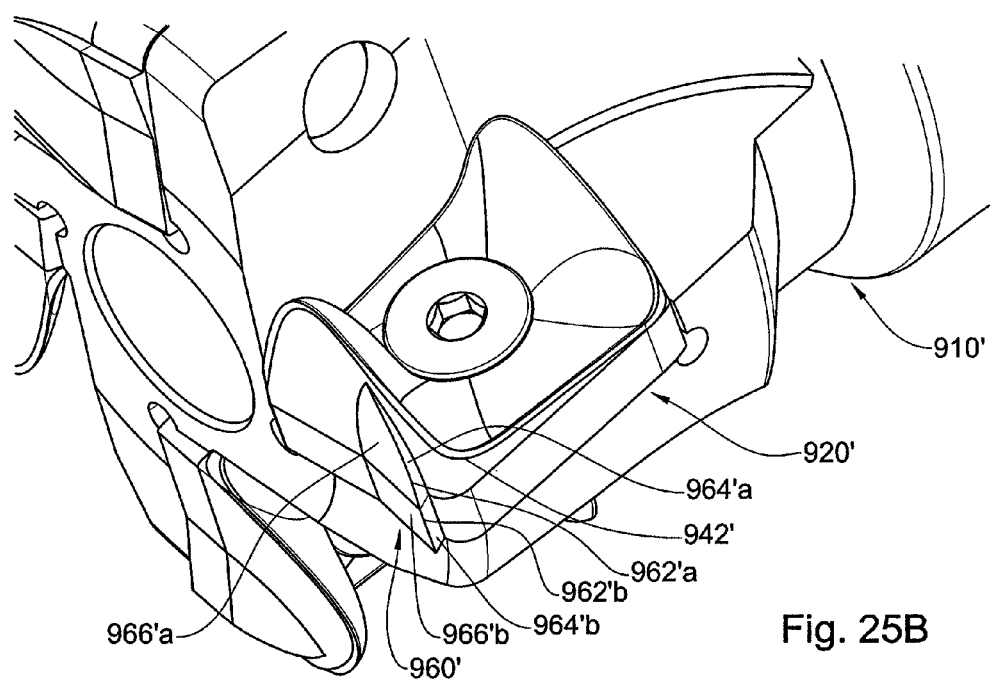
FIG. 25B is a schematic enlarged view of a milling insert used in the milling tool shown in FIG. 25A.
Figure 25C:
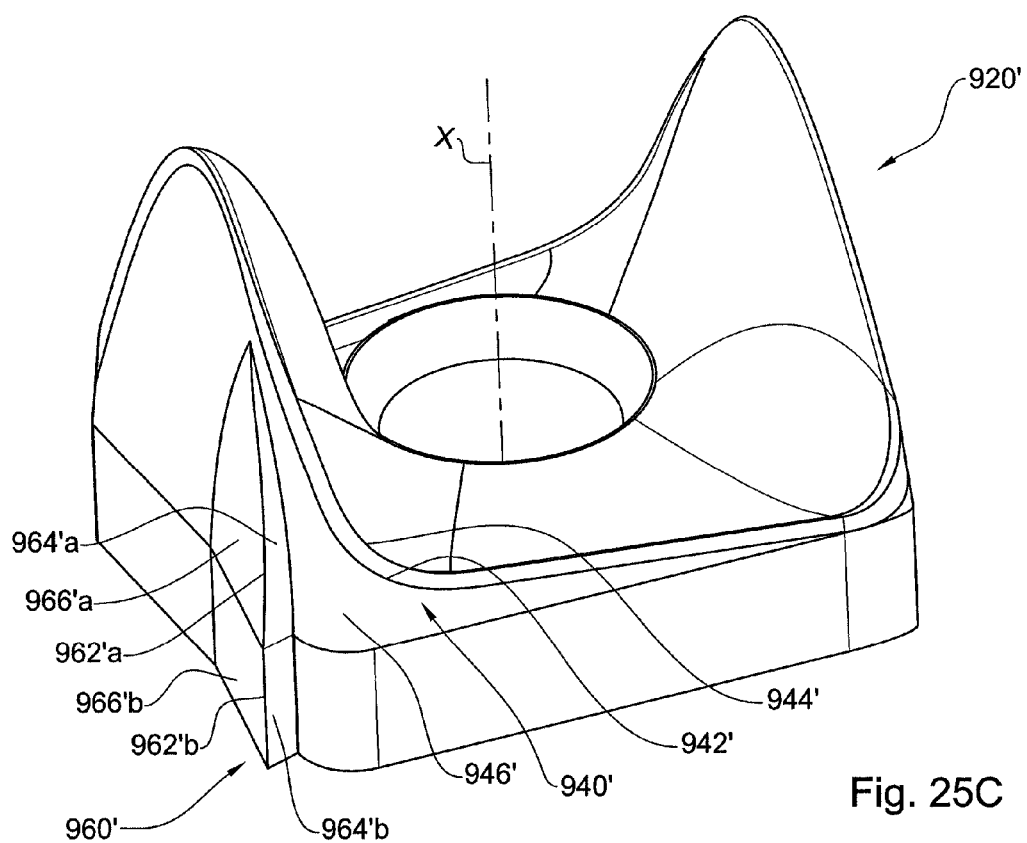
FIG. 25C is a schematic isometric view of a milling insert used in the milling tool shown in FIG. 25A.
Figure 25D:
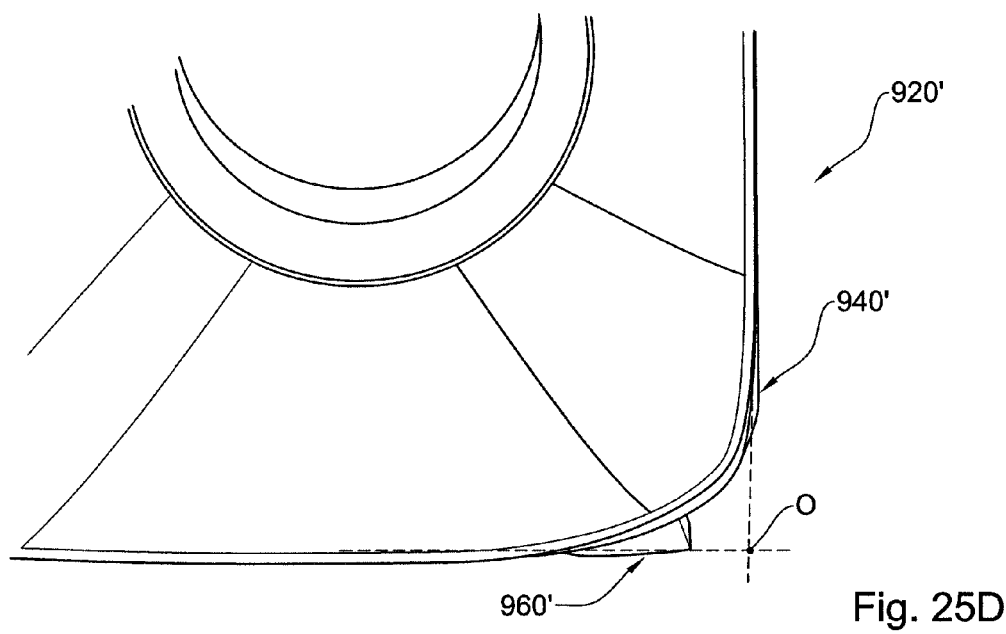
FIG. 25D is a schematic top view of a milling insert used in the milling tool shown in FIG. 25A, positioned at an operative orientation.

With reference being made to FIGS. 23A and 23B, another drilling tool is shown generally designated 720" which is essentially similar to the drilling tool 700' with the difference lying in the design of the main cutting edge 722", being a combined convex/concave shape. This is, in essence, a combination of the main cutting edge of drilling tool 700 and the length of auxiliary teeth of drilling tool 700'.

Attention is now drawn to FIGS. 24A to 24D, in which yet another milling tool is shown, generally designated 900 and comprising a holder 910 and a plurality of cutting inserts 920, each having a plurality of auxiliary teeth 930.

The main difference between the cutting inserts 920 and the previously described milling inserts lies in the design of the main cutting edge 922 which is constructed under the elongated cutting edge principles described in WO2011/001438 to the applicant, which is incorporated herein by reference.

In this particular example, the auxiliary cutting edge 932 is configured for cutting the side of the workpiece during operation of the milling tool 900.

In the example shown in FIGS. 25A to 25D, a similar milling tool is shown designated 900', with the sole difference being the orientation of the auxiliary cutting edge 932', which is configured for cutting the bottom portion of the workpiece.

As in all previously described examples, the auxiliary cutting edges 932, 932' do not reach the bisector or point O of the frame of the cutting corner.

Figure 26:
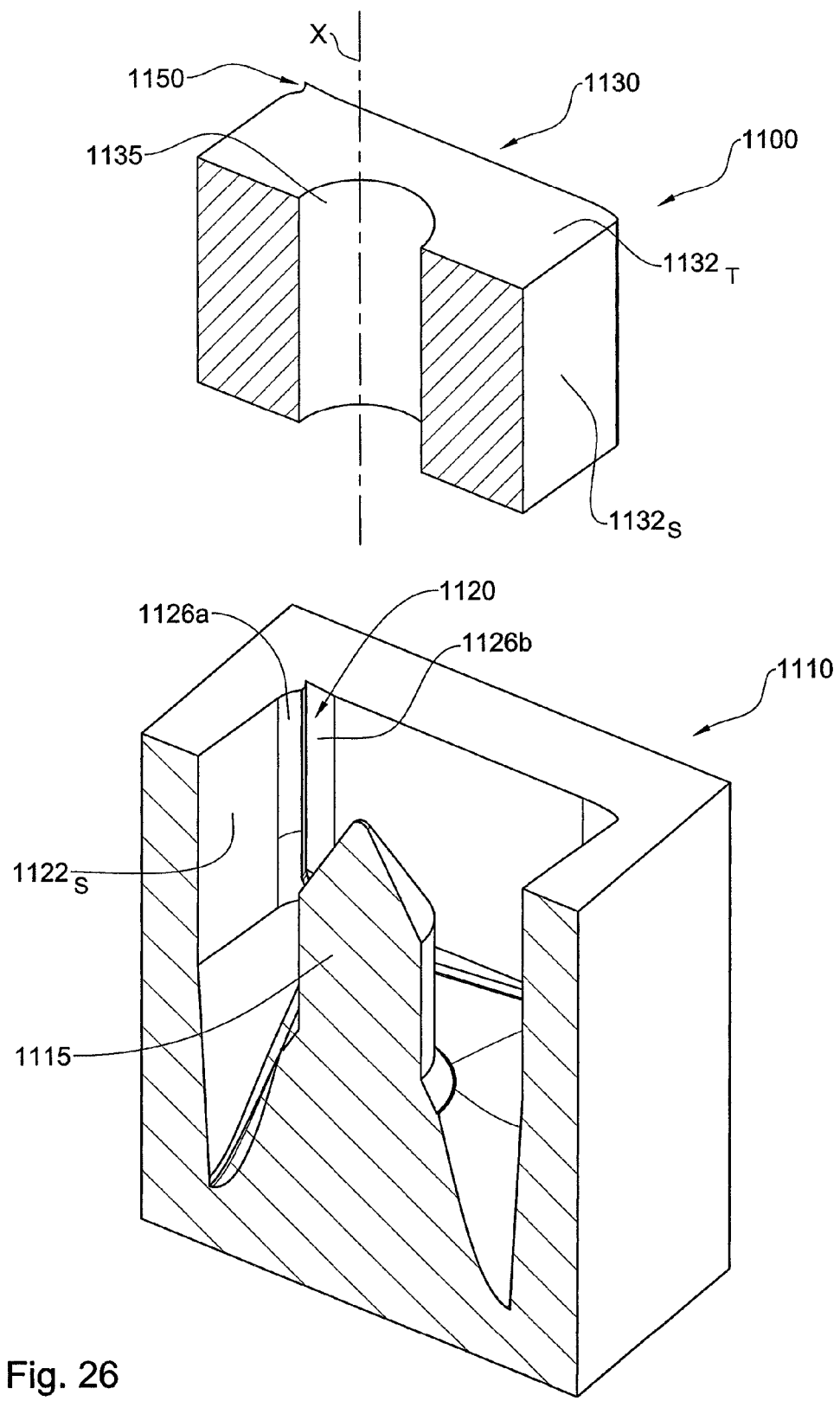
FIG. 26 is schematic isometric exploded cross-section view of a mold for the manufacture of the milling tool shown in FIGS. 24A to 24D.

In both cases, the cutting inserts are manufactured in a pressing process. For this purpose, attention is drawn to FIG. 26, in which a mold is shown comprising a male member 1130 and a female member 1110.

The male member 1130 has a cross-section similar to that of the cutting insert 920 and is formed with four projections 1150 which are configured for forming the auxiliary cutting edges 932.

The female member 1110 is formed with a central cavity 1112 and a main stub 1120 configured for forming the bore of the cutting insert. It is also formed with four grooves configured for receiving therein the projections 1150 of the male member 1130. Elements of the mold configured for forming certain features of the cutting insert 920 were marked with similar designation numbers, e.g. feature 1122 of the mold member is configured for forming the cutting edge 932 of the cutting insert, the central pole 1115 is configured for forming the main cavity 935 etc.

Figure 27:
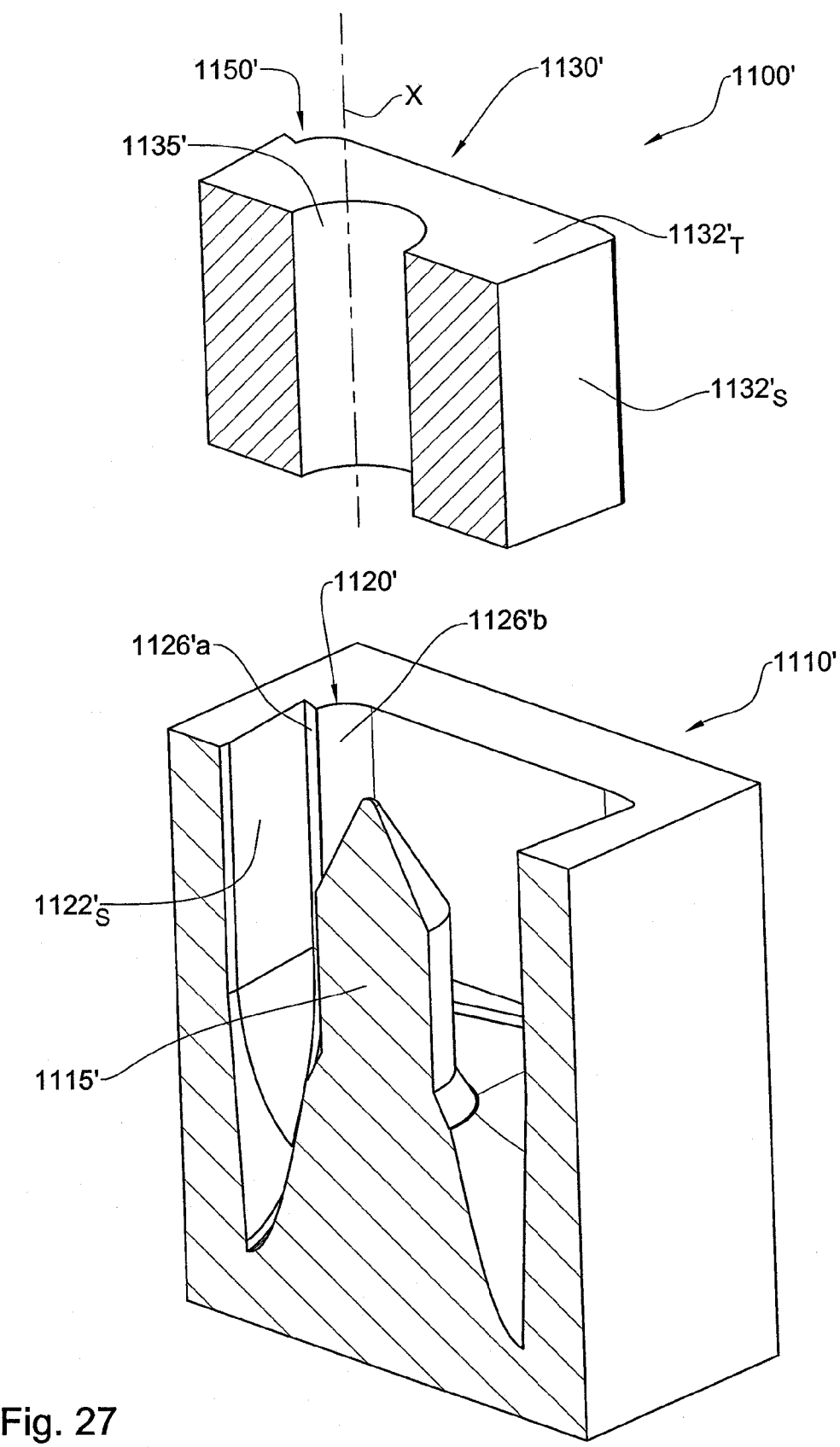
FIG. 27 is schematic isometric exploded cross-section view of a mold for the manufacture of the milling tool shown in FIGS. 25A to 25D.

Turning to FIG. 27, a mold is shown comprising a male member 1130' and a female member 1110', configured for forming the cutting insert 920'.

Similarly, the male member 1130' has a cross-section similar to that of the cutting insert 920' and is formed with four projections 1150' which are configured for forming the auxiliary cutting edges 932'.

The female member 1110' is formed with a central cavity 1112' and a main stub 1120' configured for forming the bore of the cutting insert. It is also formed with four grooves configured for receiving therein the projections 1150' of the male member 1130'.

Those skilled in the art to which this invention pertains will readily appreciate that numerous changes, variations, and modifications can be made without departing from the scope of the invention, mutatis mutandis.

The invention claimed is:

1. A cutting member, comprising:
    a cutting edge defining a cutting envelope configured for removing material from a workpiece leaving therein a corner of angle $\alpha$, said cutting edge including:
        a first cutting segment;
        a second cutting segment spaced from the first cutting segment;
        wherein respective first and second imaginary tangents of said first and second cutting segments intersect one another at point O located outside the cutting envelope, forming an angle corresponding to angle $\alpha$, thereby defining a cutting frame at least a portion of which extends beyond the cutting envelope;
        an adjoining cutting segment, extending between and bridging said first cutting segment and said second cutting segment, and at least partially contained within the cutting frame; and
    at least one auxiliary cutting element including an auxiliary cutting edge extending generally along one of said imaginary tangents and beyond said cutting envelope, wherein said auxiliary cutting edge does not intersect the other of said imaginary tangents and/or a bisector of said angle $\alpha$.

2. The cutting member according to claim 1, wherein the at least one auxiliary cutting element is associated with one of the first or second cutting segments.

3. The cutting member according to claim 1, wherein each corner can be divided into: a first zone defined between the first segment, the bisector and the tangent of the first segment, and a second zone defined between the second segment, the bisector and the tangent of the second segment, and wherein the cutting edge of the auxiliary cutting element associated with the first zone does not penetrate into the second zone and vise versa.

4. The cutting member according to claim 1, wherein the at least one auxiliary cutting segment includes a plurality of auxiliary cutting segments, and wherein each of the first and second cutting segments is provided with one of the plurality of auxiliary cutting elements.

5. The cutting member according to claim 1, wherein the auxiliary cutting edge has a leading end and a trailing end, and wherein a distance between the leading end and the trailing end is shorter than the distance between the leading end and the cutting segment with which the auxiliary cutting edge is associated.

6. The cutting member according to claim 1, wherein the adjoining cutting segment of the cutting edge has a concave shape.

7. The cutting member according to claim 1, wherein the adjoining cutting segment of the cutting edge has a first portion that is concave and a second portion that is convex.

8. The cutting member according to claim 7, wherein the concave portion of the adjoining cutting segment corresponds to a feed direction of the cutting member.

9. The cutting member according to claim 1, wherein the cutting member extends beyond the cutting frame.

10. The cutting member according to claim 1, wherein the at least one auxiliary cutting segment includes two auxiliary cutting segments, and wherein the cutting edge is provided with the two auxiliary cutting elements each of which includes an auxiliary cutting edge, a channel extends between the auxiliary cutting edges configured for passage of material from the workpiece.

11. The cutting member according to claim 1, wherein said cutting member is configured for performing any one of the following: turning, milling, drilling, or parting.

12. The cutting member according to claim 1, wherein the cutting member is a cutting insert.

13. The cutting member according to claim 1, wherein the cutting member is a portion of an integral cutting tool.

14. The cutting member according to claim 1, wherein the at least one auxiliary cutting segment includes two auxiliary cutting elements each of which includes an auxiliary cutting edge, wherein the auxiliary cutting edges do not form together a full contour around the cutting envelope of the cutting edge.

15. A cutting tool comprising the cutting member according to claim 1.

16. The cutting tool according to claim 15, wherein said cutting tool is a milling tool including a plurality of cutting portions, each of the plurality of cutting portions constituting a cutting member.

17. The cutting tool according to claim 16, wherein the auxiliary cutting element of one cutting portion is configured for removing material from a first portion of the workpiece and the auxiliary cutting element of a consecutive cutting portion is configured for removing material from a second portion of the workpiece.

18. The cutting tool according to claim 17, wherein the order of the auxiliary cutting elements alternates from one cutting portion to the next.

19. The cutting tool according to claim 15, wherein the cutting tool is a milling tool.

20. A method for removing material from a workpiece using the cutting member of claim 1 and/or the cutting tool of claim 15, said method comprising:
   a) removing material from the workpiece with the cutting edge, leaving therein a profile corresponding to the cutting envelope of the cutting member;
   b) forming a groove within the workpiece using the auxiliary cutting edge thereby leaving a profile within the workpiece different than the profile of the envelope; and
   c) repeating acts (a) and (b).

* * * * *